US011498757B2

(12) United States Patent
Austrheim

(10) Patent No.: US 11,498,757 B2
(45) Date of Patent: Nov. 15, 2022

(54) STORAGE SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 17/054,531

(22) PCT Filed: Jun. 11, 2019

(86) PCT No.: PCT/EP2019/065237
§ 371 (c)(1),
(2) Date: Nov. 11, 2020

(87) PCT Pub. No.: WO2019/238698
PCT Pub. Date: Dec. 19, 2019

(65) Prior Publication Data
US 2021/0253348 A1 Aug. 19, 2021

(30) Foreign Application Priority Data

Jun. 12, 2018 (NO) .................................... 20180813
Jul. 19, 2018 (NO) .................................... 20181005
(Continued)

(51) Int. Cl.
B65G 1/04 (2006.01)
B65G 1/06 (2006.01)

(52) U.S. Cl.
CPC ......... B65G 1/0464 (2013.01); B65G 1/0492 (2013.01); B65G 1/065 (2013.01)

(58) Field of Classification Search
CPC ..... B65G 1/0464; B65G 1/0492; B65G 1/065
See application file for complete search history.

(56) References Cited

U.S. PATENT DOCUMENTS 3,519,150 A 7/1970 Keena et al.
3,800,963 A 4/1974 Holland
(Continued)

FOREIGN PATENT DOCUMENTS

CA 2988122 A1 12/2016
CN 101553416 A 10/2009
(Continued)

OTHER PUBLICATIONS

ISRWO in PCT/EP2019/065237 dated Sep. 9, 2019, cited inter alia as statement of relevance for non-English refs cited therein.
(Continued)

Primary Examiner — Saul Rodriguez
Assistant Examiner — Ashley K Romano
(74) Attorney, Agent, or Firm — Osha Bergman Watanabe & Burton LLP

(57) ABSTRACT

The present invention provides a storage system (1) comprising a storage grid structure (104) having a top rail grid upon which container handling vehicles (200,300) work to store and retrieve storage containers (106) in and from storage columns (105) beneath the top rail grid, wherein the storage system comprises multiple transfer rails (110',111') forming a horizontal transfer rail grid (5) arranged at a level below the top rail grid, at least one transport vehicle (19) operating on the transfer rail grid, a picking/stocking station (8) for picking/stocking items between a storage container (106) and a packaging box (24), and an unloading/loading assembly (23) for unloading/loading packaging boxes containing such items, the transport vehicle (19) is arranged to move upon the transfer rail grid (5) in two perpendicular directions and comprises a carrier platform (20), wherein the transfer rail grid is arranged to allow access for the transport vehicle (19) to transport one or more packaging boxes at a
(Continued)

time between the picking/stocking station and the unloading/loading assembly (23).

13 Claims, 19 Drawing Sheets

(30) Foreign Application Priority Data

| | | | |
|---|---|---|---|
| Aug. 21, 2018 | (NO) | ................................... | 20181098 |
| Oct. 19, 2018 | (NO) | ................................... | 20181344 |
| Dec. 12, 2018 | (NO) | ................................... | 20181595 |

(56) References Cited

U.S. PATENT DOCUMENTS

| | | | |
|---|---|---|---|
| 4,538,950 A | 9/1985 | Shiomi et al. | |
| 4,909,697 A | 3/1990 | Bernard, II et al. | |
| 5,078,566 A | 1/1992 | Ferrence | |
| 5,360,306 A | 11/1994 | Nakayama et al. | |
| 5,538,809 A | 7/1996 | Bittihn et al. | |
| 6,011,998 A | 1/2000 | Lichti et al. | |
| 9,527,669 B1 | 12/2016 | Hanssen et al. | |
| 9,845,208 B2 * | 12/2017 | Lindbo | B65G 59/063 |
| 9,988,216 B1 | 6/2018 | McCalib, Jr. et al. | |
| 10,189,641 B2 * | 1/2019 | Hognaland | B65G 1/06 |
| 10,793,355 B1 * | 10/2020 | Garcia | B25J 9/0018 |
| 10,822,166 B2 * | 11/2020 | Ingram-Tedd | B65G 1/1378 |
| 10,836,577 B2 * | 11/2020 | Fryer | B65G 1/065 |
| 10,899,539 B2 * | 1/2021 | Lindbo | B65G 1/0492 |
| 10,913,601 B2 * | 2/2021 | Suzuki | H01L 21/6773 |
| 11,008,166 B2 * | 5/2021 | Gravelle | B65G 1/04 |
| 2003/0093176 A1 | 5/2003 | Ohtsuka et al. | |
| 2005/0118003 A1 | 6/2005 | Mitchell et al. | |
| 2007/0209976 A1 * | 9/2007 | Worth | B07C 3/08 |
| | | | 209/584 |
| 2007/0280814 A1 * | 12/2007 | Morency | B65G 60/00 |
| | | | 414/788 |
| 2008/0014062 A1 | 1/2008 | Yuyama et al. | |
| 2011/0027059 A1 | 2/2011 | Benedict et al. | |
| 2012/0282068 A1 | 11/2012 | Tschurwald et al. | |
| 2013/0302132 A1 | 11/2013 | D'Andrea | |
| 2014/0014470 A1 | 1/2014 | Razumov | |
| 2014/0086714 A1 | 3/2014 | Malik | |
| 2014/0277693 A1 | 9/2014 | Naylor | |
| 2014/0292274 A1 | 10/2014 | Dorval et al. | |
| 2014/0311858 A1 | 10/2014 | Keating et al. | |
| 2016/0060037 A1 | 3/2016 | Razumov | |
| 2016/0107838 A1 | 4/2016 | Swinkels et al. | |
| 2016/0137435 A1 | 5/2016 | Tanaka et al. | |
| 2016/0280460 A1 * | 9/2016 | Porat | B25J 5/04 |
| 2016/0325932 A1 | 11/2016 | Hognaland | |
| 2017/0057745 A1 | 3/2017 | Ueda et al. | |
| 2017/0166400 A1 | 6/2017 | Hofmann | |
| 2018/0068253 A1 | 3/2018 | Simms et al. | |
| 2018/0082162 A1 | 3/2018 | Durham et al. | |
| 2018/0118078 A1 | 5/2018 | Alkhaldi et al. | |
| 2018/0141754 A1 | 5/2018 | Garrett et al. | |
| 2018/0150793 A1 | 5/2018 | Lert, Jr. et al. | |
| 2020/0148474 A1 | 5/2020 | Salichs et al. | |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104828450 | 8/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 | 6/2017 |
| CN | 106829298 A | 6/2017 |
| CN | 206790852 U | 12/2017 |
| CN | 107922115 A | 4/2018 |
| CN | 108140168 A | 6/2018 |
| DE | 40 16 810 C1 | 11/1991 |
| DE | 9310690 U1 | 9/1993 |
| DE | 102009017241 | 10/2010 |
| DE | 102013009340 | 12/2014 |
| EP | 458021 | 3/1991 |
| EP | 0458021 A1 | 11/1991 |
| EP | 0534558 A1 | 3/1993 |
| EP | 2881905 A1 | 6/2015 |
| EP | 3003932 A1 | 4/2016 |
| GB | 1267751 A | 3/1972 |
| GB | 1276160 A | 6/1972 |
| GB | 2106070 A | 4/1983 |
| GB | 2211822 | 7/1989 |
| GB | 2233319 A | 1/1991 |
| JP | S64-017707 A | 1/1989 |
| JP | S6485656 A | 3/1989 |
| JP | H09152914 A | 6/1997 |
| JP | 2001192103 | 7/2001 |
| JP | 2017088404 A | 5/2017 |
| KR | 20170026074 A | 3/2017 |
| KR | 10-1793932 | 11/2017 |
| NO | 317366 B | 10/2004 |
| RU | 2008111257 A | 10/2009 |
| WO | 9614258 A1 | 5/1996 |
| WO | 2005/077789 A1 | 8/2005 |
| WO | 2009/043474 | 4/2009 |
| WO | 2012106746 A1 | 8/2012 |
| WO | 2014/075937 | 5/2014 |
| WO | 2014/075937 A1 | 5/2014 |
| WO | 2014/090684 | 6/2014 |
| WO | 2014/195901 | 12/2014 |
| WO | 2014/195901 A1 | 12/2014 |
| WO | 2014/195902 | 12/2014 |
| WO | 2014/203126 | 12/2014 |
| WO | 2014195901 | 12/2014 |
| WO | 2015/024624 | 2/2015 |
| WO | 2015084236 A1 | 6/2015 |
| WO | 2015/140216 | 9/2015 |
| WO | 2015/193278 | 12/2015 |
| WO | 2015/193278 A1 | 12/2015 |
| WO | 2016/100045 | 6/2016 |
| WO | 2016/166323 A1 | 10/2016 |
| WO | 2016/172253 | 10/2016 |
| WO | 2016166294 A1 | 10/2016 |
| WO | 2016/196815 | 12/2016 |
| WO | 2016/196815 A1 | 12/2016 |
| WO | 2016/198467 | 12/2016 |
| WO | 2016/198565 | 12/2016 |
| WO | 2016/198565 A1 | 12/2016 |
| WO | 2016198467 A1 | 12/2016 |
| WO | 2017/081281 | 5/2017 |
| WO | 2017081273 A1 | 5/2017 |
| WO | 2017081281 A1 | 5/2017 |
| WO | 2017/121512 | 7/2017 |
| WO | 2017121515 A1 | 7/2017 |
| WO | 2017/153563 A1 | 9/2017 |
| WO | 2017148963 | 9/2017 |
| WO | 2017/211596 A | 12/2017 |
| WO | 2017/211640 | 12/2017 |
| WO | 2017/220651 | 12/2017 |
| WO | 2018/050816 | 3/2018 |
| WO | 2018/162757 A1 | 9/2018 |
| WO | 2012/026824 A | 3/2021 |

OTHER PUBLICATIONS

ISRWO in application PCT/EP2019/065153 dated Sep. 12, 2019.
Norwegian Search Report in Application NO20181098, dated Jan.

(56) References Cited

OTHER PUBLICATIONS 29, 2019, cited inter alia as a statement of relevance for non-English references cited therein.
Norwegian Search Report in Application NO20181005, dated Feb. 6, 2019, cited inter alia as a statement of relevance for non-English references cited therein.
Norwegian Search Report in Application NO20181595, dated Mar. 12, 2019, cited inter alia as a statement of relevance for non-English references cited therein.
Norwegian Search Report in Application NO20181344, dated May 16, 2019, cited inter alia as a statement of relevance for non-English references cited therein.
Note: In light of the number of references cited, the applicant has made a good faith effort to assist the examiner by highlighting references cited as potentialy particularly relevant in the accompanying search reports.
Office Action issued in Chinese Application No. 201980037162.3; dated Sep. 27, 2021 (8 pages).
Extended European Search Report issued in European Application No. 21186410.3, dated Nov. 25, 2021 (5 pages).
Office Action issued in Chinese Application No. 201980039066.2 dated Sep. 10, 2021 (6 pages).
Search Report issued in Chinese Application No. 201980039066.2 dated Sep. 6, 2021 (2 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action in counterpart Chinese Patent Application No. 201980039028.7 dated Oct. 27, 2021 (15 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Office Action issued in Chinese Application No. 201980039046.5 dated Sep. 15, 2021 (18 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
Office Action in counterpart Chinese Patent Application No. 201980038106.1 dated Sep. 8, 2021 (6 pages).
Office Action in counterpart Chinese Patent Application No. 201980039693.6 dated Oct. 18, 2021 (12 pages).

* cited by examiner

Fig. 12 (Detail A)

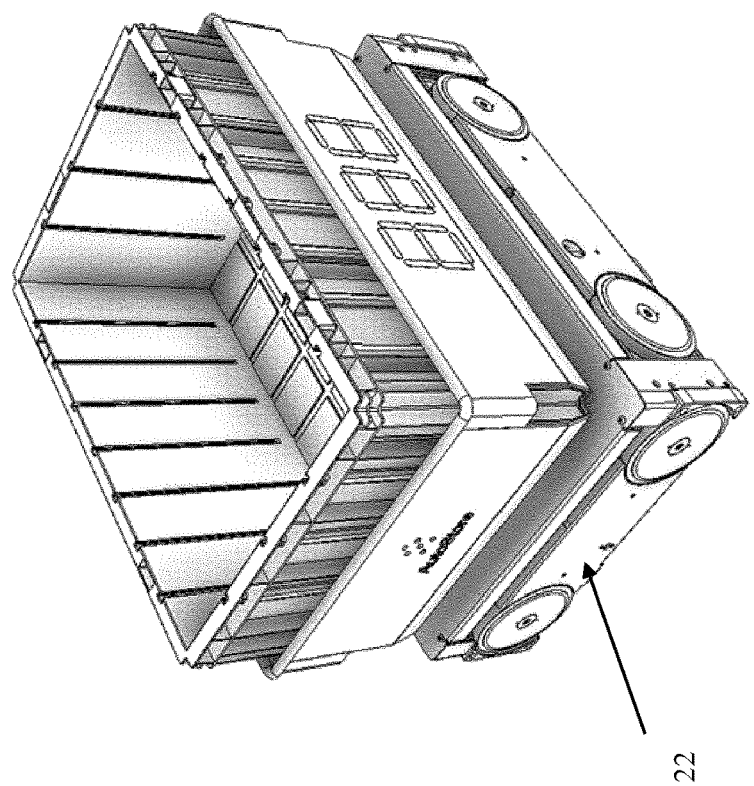
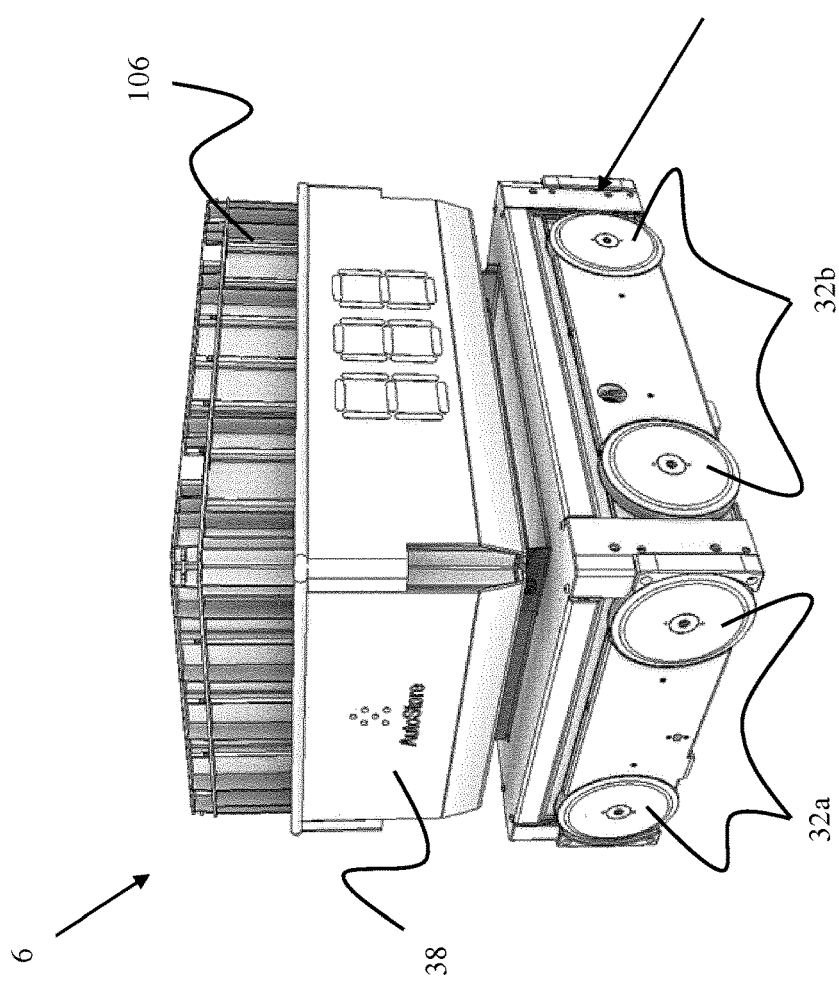
Fig. 14A
Fig. 14B

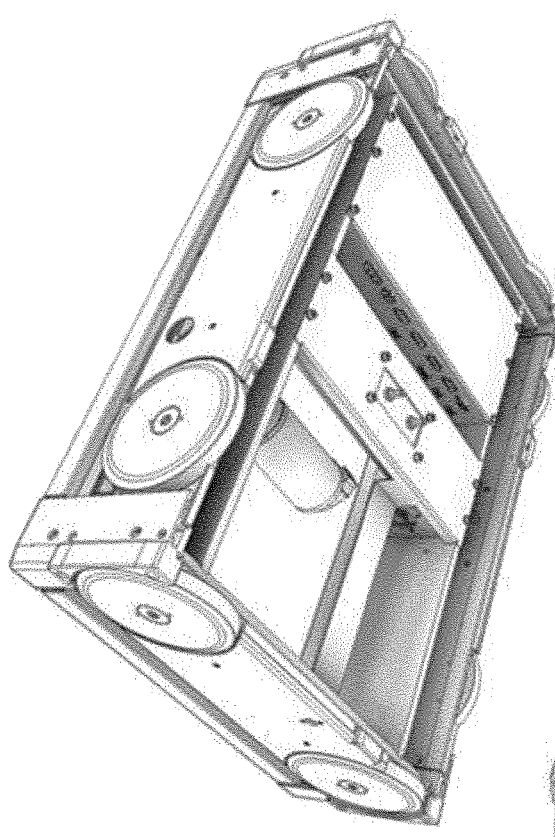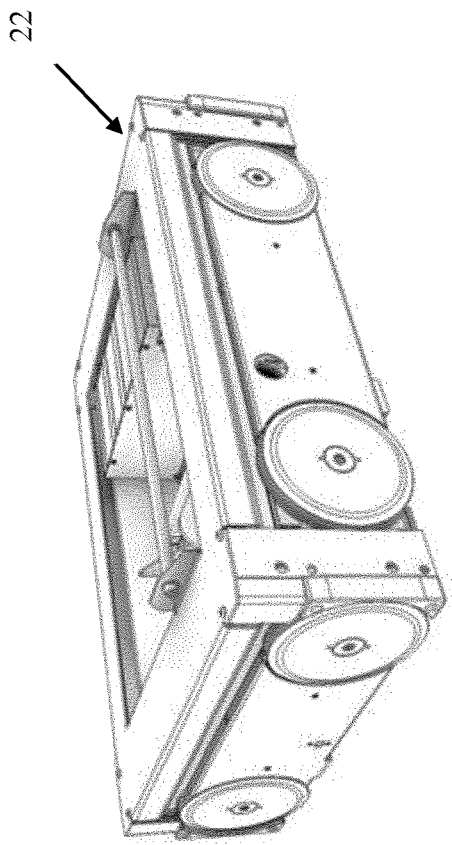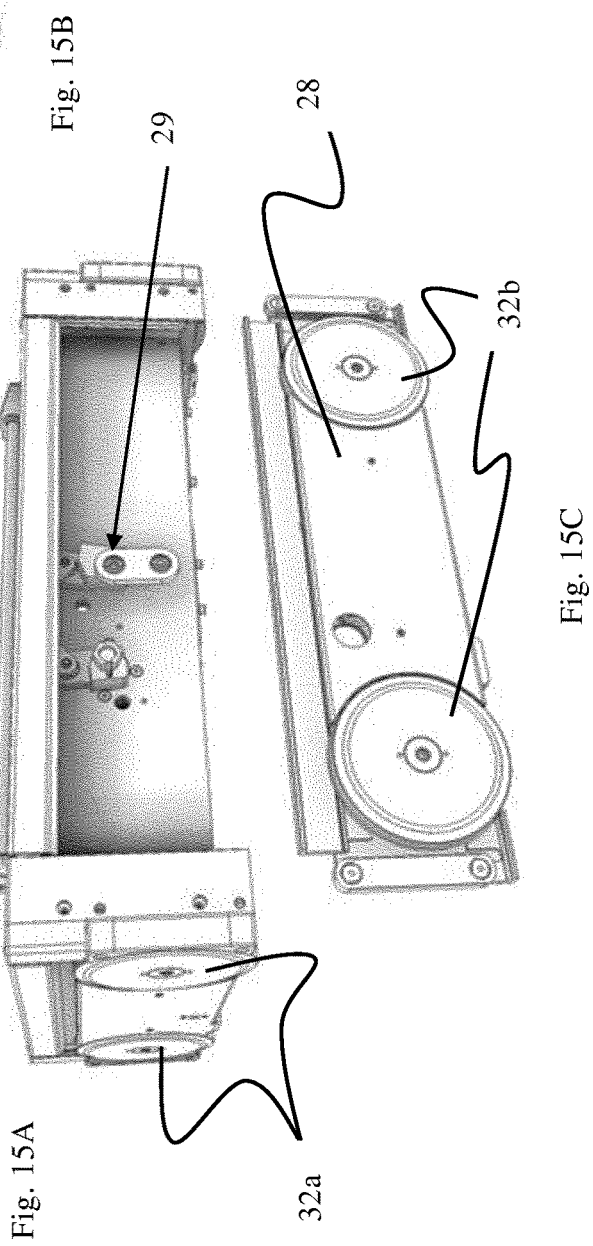
Fig. 15A
Fig. 15B
Fig. 15C

STORAGE SYSTEM

FIELD OF THE INVENTION

The present invention relates to an automated storage and retrieval system, a transport vehicle for use in an automated storage and retrieval system and a method for use of an automated storage and retrieval system.

BACKGROUND

FIGS. 1A and 2B disclose a typical prior art automated storage and retrieval system 1 with a framework structure 100. FIGS. 1B and 2B disclose prior art container handling vehicles 200,300 operating in the system 1 disclosed in FIGS. 1A and 2A, respectively.

The framework structure 100 defines a storage grid 104 comprising a plurality of upright members 102 and optionally a plurality of horizontal members 103 supporting the upright members 102. The members 102, 103 may typically be made of metal, e.g. extruded aluminium profiles.

The storage grid 104 comprises multiple grid columns 112. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the of storage containers 106 in the stacks 107, and guides vertical movement of the containers 106, but does normally not otherwise support the storage containers 106 when stacked.

The automated storage and retrieval system 1 comprises a rail system 108 (or a top rail grid) arranged in a grid pattern across the top of the storage grid 104, on which rail system 108 a plurality of container handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines the upper ends of the grid columns 112 above which the container handling vehicles 200,300 can move laterally, i.e. in a plane which is parallel to the horizontal X-Y plane. Commonly, at least one of the sets of rails 110,111 is made up of dual-track rails allowing two container handling vehicles to pass each other on neighbouring grid cells 122. Dual-track rails are well-known and disclosed in for instance WO 2015/193278 A1 and WO 2015/140216 A1, the contents of which are incorporated herein by reference.

Each prior art container handling vehicle 200,300 comprises a vehicle body and a wheel arrangement of eight wheels 201,301, wherein a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the prior art storage grid disclosed in FIGS. 1A and 2A, Z=8 identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell X=10, Y=2, Z=3. The container handling vehicles 200,300 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the top of the storage grid 104. The storage space may comprise a cavity arranged centrally within the vehicle body, e.g. as is described in WO2014/090684A1, the contents of which are incorporated herein by reference.

Alternatively, the container handling vehicles 300 may have a cantilever construction as described in NO317366, the contents of which are also incorporated herein by reference.

The container handling vehicles 200 may have a footprint, i.e. an extent in the X and Y directions, which is generally equal to the horizontal area of a grid cell 122, i.e. the extent of a grid cell 122 in the X and Y directions, e.g. as is described in WO2015/193278A1, the contents of which are incorporated herein by reference.

Alternatively, the container handling vehicles 200 may have a footprint which is larger than the horizontal area of a grid cell 122, e.g. as is disclosed in WO2014/090684A1.

In a storage grid 104, a majority of the grid columns 112 are storage columns 105, i.e. grid columns where storage containers 106 are stored in stacks 107. However, a grid 104 normally has at least one grid column 112 which is not used for storing storage containers 106, but is arranged at a location wherein the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column at which the port is located may be referred to as a transfer column 119,120. The drop-off and pick-up ports are the upper ends/openings of a respective transfer column 119,120.

The prior art storage grids 104 in FIGS. 1A and 2A comprise two transfer columns 119 and 120. The first transfer column 119 may for example comprise a dedicated drop-off port where the container handling vehicles 200,300 can drop off storage containers 106 to be transported through the transfer column 119 and further to e.g. a picking/stocking station, and the second transfer column 120 may comprise a dedicated pick-up port where the container handling vehicles 200,300 can pick up storage containers 106 that have been transported through the transfer column 120 from e.g. a picking/stocking station. A storage container may be transported through a transfer column by use of the lifting device of a container handling vehicle 200,300 or by use of a storage container lift arranged in the transfer column. Each of the ports of the first and second transfer column may be suitable for both pick-up and drop-off of storage containers.

The second location may typically be a picking/stocking station, wherein product items are removed from and/or positioned into the storage containers 106. In a picking/stocking station, the storage containers 106 are normally never removed from the automated storage and retrieval system 1 but are returned into the storage grid 104 once accessed.

For monitoring and controlling the automated storage and retrieval system 1, e.g. monitoring and controlling the location of respective storage containers 106 within the storage grid 104; the content of each storage container 106; and the movement of the container handling vehicles 200,300 so that a desired storage container 106 can be delivered to the desired location at the desired time without the container handling vehicles 200,300 colliding with each other, the automated storage and retrieval system 1 comprises a computerized control system (not shown) which typically comprises a database for keeping track of the storage containers 106.

A conveyor system comprising conveyor belts or rollers is commonly employed to transport the storage containers from a lower end of the transfer columns 119,120 to e.g. a picking/stocking station.

A conveyor system may also be arranged to transfer storage containers between different storage grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between transfer columns and stations where operators can access the storage containers.

When a storage container 106 stored in the storage grid 104 disclosed in FIG. 1A is to be accessed, one of the container handling vehicles 200,300 is instructed to retrieve the target storage container 106 from its position in the grid 104 and transport it to or through the transfer column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the transfer column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the transfer column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the transfer column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

A problem associated with known automated storage and retrieval systems 1 is that the area surrounding the pick-up and drop-off ports may become congested with container handling vehicles 200,300 instructed to drop off or pick up storage containers 106. This may seriously impede the operation of the automated storage and retrieval system 1. In small systems this situation may possibly be alleviated by adding further transfer columns to the grid, as this will allow the container handling vehicles 200,300 to be distributed among a larger number of ports of transfer columns in order to avoid congestion. However, if further ports and columns are added, the number of picking/stocking stations as well as the conveyor system infrastructure must be increased. This requires space, which may not necessarily be available. Also, adding conveyor system infrastructure and additional picking/stocking stations is costly.

In the prior art solutions for transfer of storage containers out of or into the storage grid, the ports and the respective transfer columns 119,120 are required to be arranged at a grid column 112 in/at the periphery of the storage grid, or the ports are arranged at an extension of the rail system 108 extending beyond the grid columns 112 at the periphery of the storage grid 104. Examples of such prior art solutions are disclosed in for instance WO 2014/203126 A1, WO 2012/026824 A1, WO 2016/198467 A1 and WO 2017/211596 A1. This requirement entails that the number of transfer columns 119,120 and any associated structure for storage container handling, such as picking/stocking stations, are restricted by the available space at the periphery of the storage grid. Further, by having the transfer columns 119,120 arranged at or outside the periphery of the storage grid, the container handling vehicles are often required to travel long distances upon the storage grid to reach the closest port. The latter is a hindrance to obtaining an optimum efficiency, in particular when operating large storage grids, wherein the distance from a centre section of the storage grid to the periphery is long.

A further issue with the prior art solutions is the lack of flexibility regarding the handling of storage containers exiting or entering the storage grid. That is, a storage container from which an item is to be picked or in which an item is to be stocked must be delivered to a port specifically designated for the purpose of picking/stocking items. Similarly, a storage container exiting the grid for the purpose of being transported to e.g. a neighbouring storage grid or assembly line must be delivered to a port specifically designated for this purpose.

Some of the above-mentioned issues regarding flexibility may be solved by use of extensive conveyor systems, i.e. conveyor belts, rollers etc., as well as dedicated storage container lifts. However, such systems are expensive, service intensive and are vulnerable to single point of failure events that may disrupt the operation of the storage system.

An efficiency issue with prior art automated storage and retrieval systems 1 is that the separate drop-off ports and pick-up ports of the transfer columns 119,120 require the container handling vehicles 200,300 to move to a storage column 105 or a pick-up port after drop-off to retrieve a new storage container 106. Likewise, the container handling vehicles 200,300 have to be empty of a storage container 106 when they are sent to a pick-up port 120 to pick up a storage container. This is often inefficient and causes increased congestion around the ports, as container handling vehicles 200,300 are moving around on the grid without a storage container 106 as payload.

Yet an efficiency issue with prior art automated storage and retrieval systems is the way items to be shipped out are transported from a picking/stocking stations, wherein the items are packed in boxes, to a loading station wherein the packed items are for instance loaded onto a truck for transport to a customer.

In view of the above, the aim of the present invention is to provide an automated storage and retrieval system, and a method for operating such a system, that solves or at least mitigates one or more of the aforementioned problems related to the use of prior art storage and retrieval systems.

The main objective of the present invention is to provide an automated storage and retrieval system in which items may be transported between a picking/stocking station of the storage system and a site external to the storage system in a more efficient manner.

SUMMARY OF THE INVENTION

The present invention is defined by the appended claims and in the following:

In a first aspect, the present invention provides a storage system comprising a storage grid structure having a top rail grid upon which container handling vehicles work to store and retrieve storage containers in and from storage columns beneath the top rail grid, wherein the storage system comprises multiple transfer rails forming a horizontal transfer rail grid arranged at a level below the top rail grid, at least one transport vehicle operating on the transfer rail grid, a picking/stocking station for picking/stocking items between a storage container and a packaging box, and an unloading/loading assembly for unloading/loading packaging boxes containing such items, the transport vehicle is arranged to move upon the transfer rail grid in two perpendicular directions and comprises a carrier platform, wherein the transfer rail grid is arranged to allow access for the transport vehicle to transport one or more packaging boxes at a time between the picking/stocking station and the unloading/loading assembly.

In other words, the transfer rail grid extends between the picking/stocking station and the unloading/loading assembly such that an item picked from a storage container and loaded onto the transport vehicle may be transported by the transport vehicle from the picking/stocking station to the unloading/loading assembly.

In other words, the picking/stocking station is for picking/stocking items from/in a storage container after retrieving the storage container from the storage grid or before introducing the storage container into the storage grid. The picking/stocking station may be operatively connected to a transfer column of the storage grid structure, such that a storage container may be transferred between the picking/stocking station and a storage column.

The unloading/loading assembly may comprise any of a pallet lifter and/or a conveyor system arranged to load/unload packaging boxes and/or pallets to/from the transport vehicle.

In other words, the transfer rail grid may be arranged such that the transport vehicle can access or be arranged at the unloading/loading assembly.

Alternatively, the storage system may be defined as comprising the unloading/loading assembly.

In an embodiment of the storage system, the transfer rail grid may comprise a transfer grid area at which the unloading/loading assembly is arranged.

In an embodiment of the storage system, the carrier platform may be arranged to support a pallet. In other words, the transport vehicle may be suitable for transporting one or more packaging boxes arranged on a pallet between the picking/stocking station and the unloading/loading assembly.

In an embodiment of the storage system, the storage grid structure may comprise vertical column profiles defining multiple storage columns, in which storage containers can be stored one on top of another in vertical stacks, and at least one transfer column, the column profiles are interconnected at their upper ends by top rails forming the horizontal top rail grid upon which the container handling vehicles may move in two perpendicular directions.

In an embodiment of the storage system, the transport vehicle may have a wheel arrangement comprising a first set of wheels enabling movement of the transport vehicle in a first direction and a second set of wheels enabling movement of the transport vehicle in a second direction perpendicular to the first direction, and each set of wheels comprises at least two pairs of wheels arranged on opposite sides of the transport vehicle.

In an embodiment of the storage system, the carrier platform may comprise a conveyor assembly arranged to move an item arranged on the carrier platform in a horizontal direction off the transport vehicle. The conveyor assembly may comprise any suitable conveyor solution, such as multiple rollers, a belt conveyor and/or a chain conveyor. The item movable by the conveyor assembly may be any type of packaging boxes, pallets and storage containers.

In an embodiment of the storage system, the transport vehicle may comprise at least two adjacently connected wheel base units upon which the carrier platform is arranged. Each wheel base unit may feature a wheel arrangement, wherein a first set of wheels enable movement of the transport vehicle in the first direction upon the transfer rail grid and a second set of wheels enable movement in the second direction, and each set of wheels comprises two pairs of wheels arranged on opposite sides of the wheel base unit.

In an embodiment of the storage system, each wheel arrangement may comprise eight wheels and each set of wheels may comprise four wheels.

One or both sets of wheels in the wheel arrangement may be lifted and lowered, so that the first set of wheels and/or the second set of wheels can be engaged with the respective set of rails at any one time.

In an embodiment of the storage system, each wheel base unit may have a horizontal periphery fitting within the horizontal area defined by a grid cell of the transfer rail grid.

In an embodiment of the storage system, the carrier platform may be sized to accommodate at least two of the storage containers side by side. The carrier platform may be sized to accommodate four of the storage containers, preferably adjacently arranged in a two by two configuration. An advantage of having the carrier platform sized to accommodate at least two storage containers is the possibility of using the transport vehicle for loading or retrieving storage containers to/from the storage grid structure. This feature may for instance facilitate the initial loading of storage containers to the storage system and the retrieval of used storage containers from the storage grid structure to be replaced due to wear.

In an embodiment of the storage system, the transport vehicle may comprise four connected wheel base units, preferably connected in a two by two configuration. In other words, the four wheel base units are adjacently arranged two by two.

In an embodiment of the storage system, at least the transfer rails may extend in one of two perpendicular directions of the transfer rail grid are dual-track rails, such that the transport vehicle may pass another transport vehicle upon an adjacent grid cell of the transfer rail grid when moving in the one direction.

In an embodiment of the storage system, the storage grid structure may comprise at least one horizontal transfer section, and the storage system may comprise multiple container transfer vehicles arranged to move upon the transfer rail grid in at least one horizontal direction, and the transfer section is arranged at a level below the top rail grid and extends from an external side of the storage grid structure to a position below the at least one transfer column and comprises at least a section of the transfer rail grid upon which section the container transfer vehicles may pass each other and move in two perpendicular horizontal directions; and each of the container transfer vehicles comprises a container carrier for carrying a storage container and a single wheel base unit; and wherein the at least one transfer column extends from the top rail grid to the transfer section, such that a storage container may be transferred between the top rail grid and the container carrier of one of the container transfer vehicles.

In other words, the at least one transfer column may extend from the top rail grid to the transfer section, such that a storage container may be transferred between the top rail grid and the container carrier of one of the container transfer vehicles when the container transfer vehicle is arranged on the transfer rail grid at a position below the transfer column.

The at least one transfer column may also be defined as a column for vertical transfer of a storage container between different levels of the grid structure, preferably by use of a container handling vehicle.

The transfer section may in other words be defined as being arranged at a level below the level of the top rail grid.

In an embodiment of the storage system, the transfer grid area may be accessible by the container transfer vehicles and may be termed a multi-use transfer grid area.

In an embodiment of the storage system, at least the transfer rails may extend in one of two perpendicular directions of the transfer rail grid may be dual-track rails, such that the container transfer vehicles and/or the transport vehicles may pass each other upon adjacent grid cells of the transfer rail grid when moving in the one direction. In other words, the transfer rails of the transfer rail grid may extend in two perpendicular horizontal directions, and at least the transfer rails extending in one of the two perpendicular directions of the transfer rail grid may be dual-track rails, such that the container transfer vehicles and/or the transport vehicles may pass each other upon adjacent grid cells of the transfer rail grid when moving in the one direction In an embodiment of the storage system, the transfer rails may be dual-track rails, such that the container transfer vehicles and/or the transport vehicles may pass each other upon adjacent grid cells of the transfer rail grid.

In an embodiment of the storage system, each of the container transfer vehicles may have a horizontal periphery fitting within the horizontal area defined by a grid cell of the transfer rail grid. In other words, the transfer rail grid may comprise multiple grid cells defined by the transfer rail grid, and each of the container transfer vehicles may have a horizontal periphery fitting within the horizontal area defined by one of the grid cells of the transfer rail grid, such that the container transfer vehicles may pass each other upon adjacent grid cells of the transfer rail grid; in other words, such that the container transfer vehicles may pass each other when moving on adjacent grid cells of the transfer rail grid.

In an embodiment of the storage system, the height of the transfer section may be sufficient to allow a container transfer vehicle to travel within the transfer section when carrying a storage container.

The transfer rails may be defined as forming, providing, and/or being a part of, the transfer rail grid upon which the container transfer vehicles may move in at least one horizontal directions. Further, the container transfer vehicles may move in two perpendicular horizontal directions upon at least the section of the transfer rail grid being part of the transfer section. In other words, at least the transfer rail grid being part of the transfer section provides at least two perpendicular transfer vehicle paths, allowing a container transfer vehicle to move upon the transfer rail grid in two perpendicular directions.

In an embodiment of the storage system, at least a part of the transfer rail grid may be formed or provided by transfer rails arranged external to the storage grid. In other words, at least a part of the transfer rail grid may be arranged external to the storage grid.

In an embodiment of the storage system, the design of the transfer rails and the transfer rail grid may be similar, or identical, to the top rails and the top rail grid, respectively.

In an embodiment of the storage system, the transfer rail grid and the top rail grid may have substantially similar or identical dimensions. In other words, the transfer rails and the top rails provide respective rail grids having grid cells of the same horizontal extent and/or dimension. This feature is advantageous in that it allows for multiple adjacent transfer columns, through which storage containers may be transferred simultaneously to respective adjacent container transfer vehicles arranged in the transfer section.

In an embodiment of the storage system, the transfer rail grid may extend from the position below the at least one transfer column to a second position external to the storage grid structure. In other words, the transfer rail grid extends from the position below the at least one transfer column to a second position external to the storage grid structure, such that a container transfer vehicle may move from the position below the at least one transfer column to the second position.

In an embodiment of the storage system, the transfer rails may provide at least one transfer vehicle path extending from a position below the at least one transfer column to a second position external to the storage grid structure, i.e. such that a container transfer vehicle may move from the position below the at least one transfer column to the second position. The transfer rails may provide a plurality of transfer vehicle paths extending from a position below the at least one transfer column to the second position external to the storage grid structure.

In an embodiment of the storage system, the wheel arrangement of each container transfer vehicle may comprise eight wheels, wherein a first set of four wheels enable the lateral movement of the container transfer vehicle in a first direction and a second set of the remaining four wheels enable the lateral movement in a second direction being perpendicular to the first direction. One or both sets of wheels in the wheel arrangement is connected to a wheel lifting mechanism and can be lifted and lowered, so that the first set of wheels and/or the second set of wheels can be engaged with the respective set of transfer rails of the transfer rail grid at any one time.

In an embodiment of the storage system, each of the container handling vehicles may comprise a wheel arrangement similar to the wheel arrangement of the container transfer vehicles, for engaging the respective set of top rails of the top rail grid.

In an embodiment of the storage system, the at least one transfer column may extend from the top rail grid to the transfer section, such that a container handling vehicle may transfer a storage container between the top rail grid and the container carrier of one of the container transfer vehicles. Each of the container handling vehicles may comprise a lifting device for vertical transfer of a storage container.

In an embodiment of the storage system, the transfer section may extend from a first opening at an external side of the storage grid structure to at least a second opening at an external side of the storage grid structure. In other words, the transfer section extends through an internal section of the storage grid structure from a first opening at an external side of the storage grid structure to at least a second opening at the same or different external side of the storage grid structure The term "opening" is intended to mean a gap in the storage grid structure through which gap (or opening) at least one container transfer vehicle may pass while carrying a storage container. Preferably, the first and/or second opening have a width allowing the passage of at least two container transfer vehicles simultaneously.

In an embodiment of the storage system, the first and second openings may be arranged at separate external sides of the storage grid structure, preferably the first and second openings are arranged at opposite external sides of the storage grid structure.

In an embodiment of the storage system, the transfer rails and/or the transfer rail grid may provide at least two adjacent transfer vehicle paths, such that at least two of the container transfer vehicles may pass each other in the transfer section, i.e. may pass each other when moving on the transfer rails or the transfer rail grid in the transfer section. Preferably the transfer rail grid comprises dual-track rail allowing the container transfer vehicles to pass each other at adjacent grid cells of the transfer rail grid. In a further embodiment, the transfer rails, or the transfer rail grid, provides at least three transfer vehicle paths, such that at least three container transfer vehicles may pass each other in one direction within the transfer section. In an embodiment, the storage system may comprise multiple transfer columns.

In an embodiment of the storage system, the transfer section may extend below the multiple transfer columns. Preferably, the transfer section extends below multiple adjacent transfer columns.

In an embodiment of the storage system, the multiple transfer columns may be arranged above one of the transfer vehicle paths.

In an embodiment, each of the multiple transfer columns may be arranged above a grid cell of the transfer rail grid and may be arranged above only one grid cell i.e. above a respective grid cell of the transfer rail grid.

In a further embodiment, the multiple transfer columns may be arranged above only one of several (e.g. two or three) transfer vehicle paths. In this manner, one (or a single) vehicle path may be dedicated to container transfer vehicles receiving or delivering storage containers from/to the at least one transfer column, while the remaining vehicle paths are dedicated for transfer/movement of container transfer vehicles, optionally carrying a storage container, out of or into the transfer section.

In an embodiment of the storage system, the transfer rail grid may extend from an external side of the storage grid to a second position external to the storage grid structure.

In an embodiment of the storage system, the transfer rail grid may extend from the position below the at least one transfer column to a second position external to the storage grid structure. The second position may be at any suitable area, arrangement or station for further processing or transfer of a storage container or its content, or at any suitable position for parking of a container transfer vehicle, e.g. a charging station for the battery driving the container transfer vehicle or a temporary storage position of a storage container arranged on a container transfer vehicle.

In an embodiment of the storage system, the second position may be arranged at a picking/stocking station or area, such that an operator/robot may access the content of a storage container when arranged on a container transfer vehicle.

In an embodiment of the storage system, the second position may be below a transfer column in a transfer section of a second storage grid structure. The second storage grid structure comprises any of the features of the storage grid structure of the first aspect, and its embodiments, as defined above. Alternatively, the first aspect may be defined as a storage system comprising at least a first storage grid structure. In yet another embodiment, the transfer rails or transfer rail grid extends to a third position below a transfer column in a transfer section of a third storage grid structure. In a storage system comprising a first and a second storage grid structure, the second storage grid structure may be arranged at any level and/or position relative the first storage grid structure. When the first and a second storage grid structure are arranged at different levels, the transfer rail grid may comprise a container transfer vehicle lift for lifting a container transfer vehicle between separate levels of the transfer rail grid.

An advantage of the present invention is the possibility of easily interconnecting multiple separate storage grid structures and optionally any third-party storage system. This provides an increase in fire safety since the multiple storage grid structures are easily separated in a manner which prevents a fire from spreading from one storage grid structure to another. Further, the use of multiple separate storage grid structures allows for an improved utilization of available space in a storage house or location. Thus, the storage system of the first aspect may also comprise multiple storage grid structures. Each storage grid structure may be interconnected by the transfer rail grid, such that the container transfer vehicles may move between any of the multiple storage grid structures.

In an embodiment of the storage system, the transfer rail grid may comprise an interface connectable to a third-party storage, production and/or distribution system. The transfer rail grid may be integrable with a third-party storage, production and distribution system such that storage containers, packaging boxes and/or pallets can be transported between the storage system of the first aspect and the third-party storage, production and/or distribution system. The transfer rail grid may be connectable to a third-party storage, production and distribution system such as production facility, a storage grid, assembling facility, reception or shipping location, etc. The connection may be by means of a connectable rail system or a conveyor system comprising conveyors employed to transport the storage containers, packaging boxes and/or pallets between the transfer rail grid and the third-party storage, production and/or distribution system.

In an embodiment of the storage system, the second position may be at a production facility, e.g. an assembly line or assembly station.

In an embodiment of the storage system, the transfer rail grid may comprise at least one transfer vehicle path arranged external to the storage grid structure and interconnecting the first and second openings of the transfer section arranged at separate external sides (or side sections) of the storage grid structure, e.g. such that the transfer section extends between two opposite sides/walls of the storage grid.

In an embodiment of the storage system, the at least one transfer column may be spaced from the horizontal periphery of the storage grid structure, i.e. the at least one transfer column is separated from the periphery of the storage grid structure by at least one column, e.g. a storage column.

In an embodiment of the storage system, the transfer section may extend to a section or part of, or a position within, the storage grid structure wherein the horizontal distance to any external side of the storage grid corresponds to the width of at least five adjacent grid columns or wherein the horizontal distance to the external side of the storage grid from which the transfer section extends corresponds to the width of at least five adjacent grid columns.

In an embodiment of the storage system, the length of the transfer section may be equal to at least half the length of an external side of the storage grid structure, which external side extends in the same direction as the transfer section.

In an embodiment of the storage system, the transfer section may comprise, or may be defined by, multiple horizontal ceiling profiles, vertical support profiles arranged at opposite ends of at least some of the ceiling profiles, e.g. at the opposite ends of at least some of the ceiling profiles, and the transfer rails, or a section of the transfer rail grid, arranged within the storage grid. The ceiling and support profiles may also be termed ceiling and support beams.

In an embodiment of the storage system, the multiple horizontal ceiling profiles may provide, or may be arranged as, a horizontal support grid.

In an embodiment of the storage system, the height of the transfer section may be defined by the distance between a lowermost surface of a ceiling profile and an upper surface of an opposing transfer rail of the transfer rail grid. In other words, the height is defined by the distance between a ceiling profile and an opposing transfer rail. Consequently, a container transfer vehicle carrying a storage container has a height being lower than the height of the transfer section when arranged on the transfer rail grid.

In an embodiment of the storage system, the width of the transfer section may be defined by the distance between the two support profiles connected at opposite ends of a common ceiling profile.

In an embodiment of the storage system, the multiple transfer columns may be defined by vertical column profiles extending from the top rail grid to the ceiling profiles and/or the support grid.

In an embodiment, the storage system may comprise multiple storage columns arranged above the transfer section, which columns comprise stopper elements, such that storage containers arranged in the storage columns are prevented from entering the transfer section.

In an embodiment, the storage system may comprise an operator access passage arranged adjacent to at least one side of the transfer section. The access passage may be arranged below multiple storage columns arranged adjacent to at least one side of the transfer section, which storage columns comprise stopper elements, such that storage containers arranged in the storage columns are prevented from entering the access passage. The access passage may run adjacent to the transfer section, such that an operator or service person may access a container transfer vehicle arranged on the transfer rail grid or vehicle path(s) within the transfer section. The stopper elements may be arranged at a suitable height for allowing an operator to walk beneath any storage container accommodated in the row of storage columns adjacent to the transfer section.

In an embodiment, the transfer of the storage container between the top rail grid and the container carrier of one of the container transfer vehicles may be performed by a dedicated container lift arranged in the transfer column. However, the transfer of the storage container between the top rail grid and the container carrier of one of the container transfer vehicles is preferably performed by any of the container handling vehicles, i.e. by use of a lifting device of any of the container handling vehicles.

The at least one transfer column is preferably arranged such that a container handling vehicle may lower a storage container from the top rail grid, via the transfer column, to a container transfer vehicle arranged below the transfer column. Consequently, the lower end of the transfer column has an opening allowing the storage container to enter the transfer section from above.

In an embodiment of the storage system, the transfer section may extend to an internal section of the storage grid structure, wherein the horizontal distance to an external side, side wall or section of the storage grid corresponds to the width of at least five, at least six or at least seven adjacent grid columns. In other words, the transfer section may extend to a position below a transfer column being separated from any external side section of the storage grid structure. The transfer column may for example be separated from any external side section of the storage grid structure by at least five, at least six or at least seven adjacently arranged storage columns, or may be arranged proximate to a center of the storage grid structure. Having a transfer section extending a sufficient length within the storage grid structure ensures that the distances between the storage columns and the transfer columns are minimized. Consequently, the container handling vehicles will spend less time travelling back and forth to the transfer columns and the operation of the system is optimized.

The container carrier may be arranged to receive a container from above and hence carry that container above the container transfer vehicle, e.g. carry the container at a level above a vehicle body of the container transfer vehicle. The storage system may be arranged such that in use containers are passed directly between container handling vehicles and container transfer vehicles.

The container transfer vehicle and/or the transport vehicle may comprise a weighing mechanism in order to measure the weight of a storage container, packaging box and/or pallet. The weighing mechanism may for example be based on a commercially available electronic weighing scale. The weighing mechanism may provide information concerning the contents inside each storage container, packaging box and/or pallet, such as the total weight, the number of units, the internal weight distribution and/or the location within the storage grid the storage container, packaging box and/or pallet should be placed.

The first aspect of the invention may alternatively be defined as a storage system comprising a storage grid structure and multiple container handling vehicles, the storage grid structure comprises vertical column profiles defining multiple storage columns, in which storage containers can be stored one on top of another in vertical stacks, and at least one transfer column, the column profiles are interconnected at their upper ends by top rails forming a horizontal top rail grid upon which the container handling vehicles may move in two perpendicular directions, the container handling vehicles are able to retrieve storage containers from, and store storage containers in, the storage columns, and transport the storage containers on the storage grid structure, wherein the storage system comprises multiple transfer rails forming a horizontal transfer rail grid arranged at a level below the top rail grid, at least one transport vehicle and a picking/stocking station,
the transport vehicle is arranged to move upon the transfer rail grid in two perpendicular directions and comprises a carrier platform sized to accommodate at least two of the storage containers side by side,
the picking/stocking station is for picking/stocking items from/in a storage container,
the transfer rail grid comprises a transfer grid area arranged to allow access to the transport vehicle by an unloading/loading assembly for unloading/loading items from/to the transport vehicle, and
the transfer rail grid extends between the picking/stocking station and the unloading/loading assembly.

In a second aspect, the present invention provides a transport vehicle for a storage system according to any of the preceding claims, comprising a carrier platform and at least two adjacently connected wheel base units, the carrier platform supported upon the wheel base units, and each wheel base unit features a wheel arrangement having a first set of wheels enabling lateral movement of the transport vehicle in a first direction upon a rail grid and a second set of wheels enabling lateral movement of the transport vehicle in a second direction being perpendicular to the first direction.

In other words, each wheel base unit features a wheel arrangement having a first set of wheels enabling lateral movement of the wheel base unit, and consequently the transport vehicle, in a first direction upon a rail grid and a second set of wheels enabling lateral movement in a second direction being perpendicular to the first direction.

In an embodiment, each wheel arrangement may comprise eight wheels and each set of wheels may comprise four wheels.

In an embodiment, each set of wheels may comprise two pairs of wheels arranged on opposite sides of the wheel base unit.

In an embodiment of the transport vehicle, one or both sets of wheels in the wheel arrangement can be lifted and lowered, so that the first set of wheels and/or the second set of wheels can be engaged with a respective set of rails of the rail grid at any one time.

The wheels may be arranged such that the first set of wheels may be in contact with a first pair of opposite rails of a grid cell of the rail grid, while the second set of wheels are arranged above a second pair of opposite rails of the same grid cell, or vice versa.

In an embodiment of the transport vehicle, the rail grid upon which the transport vehicle may move features grid cells having a horizontal area within which a horizontal periphery of the wheel base unit may fit or be accommodated. In other words, the wheel base unit has a horizontal periphery fitting within the horizontal area of a grid cell of the rail grid.

In an embodiment of the transport vehicle, the carrier platform may comprise a conveyor assembly able to move an item arranged on the carrier platform in a horizontal direction off the transport vehicle. In other words, the conveyor assembly is arranged such that an item arranged on the carrier platform may be transferred off the carrier platform in a horizontal direction.

In a third aspect, the present invention provides a method of transporting items in a storage system according to the first aspect, comprising the steps of:
retrieving at least one item from a storage container arranged in the picking/supply station;
loading the item onto the transport vehicle;
moving the transport vehicle from the picking/supply station to the unloading/loading assembly;
retrieving the item from the transport vehicle by use of the unloading/loading assembly.

In a fourth aspect, the present invention provides a method of transporting items into a storage system according to the first aspect, comprising the steps of:
supplying at least one item to the transport vehicle by use of the unloading/loading assembly;
moving the transport vehicle from the unloading/loading assembly to the picking/supply station;
retrieving the item from the transport vehicle; and
loading the item into a storage container arranged in the picking/supply station.

The term "transfer section" is in the present application intended to mean a substantially horizontal tunnel/passageway and/or recess in the storage grid structure, having at least one open end or side, i.e. opening, at an external side or wall of the storage grid. The opening allowing a container transfer vehicle to enter/exit the transfer section from a position external to the storage grid structure. Alternatively, the term "transfer section" may be replaced by "transfer section space" or "transfer space".

SHORT DESCRIPTION OF THE DRAWINGS

The present invention is described in detail below by way of example only and with reference to the following drawings:

FIGS. 1 and 2 are perspective views of a prior art automated storage and retrieval system, wherein FIG. 1A and FIG. 2A show the complete system and FIG. 1B and FIG. 2B show examples of prior art container handling vehicles suitable for use in the system.

FIGS. 14A and 14B are perspective views of an exemplary container transfer vehicle for use in a storage system according to the invention.

FIGS. 15A, 15B and 15C are perspective views of a wheel base unit of the container transfer vehicle in FIGS. 14A and 14B.

DETAILED DESCRIPTION OF THE INVENTION

Figure 1:
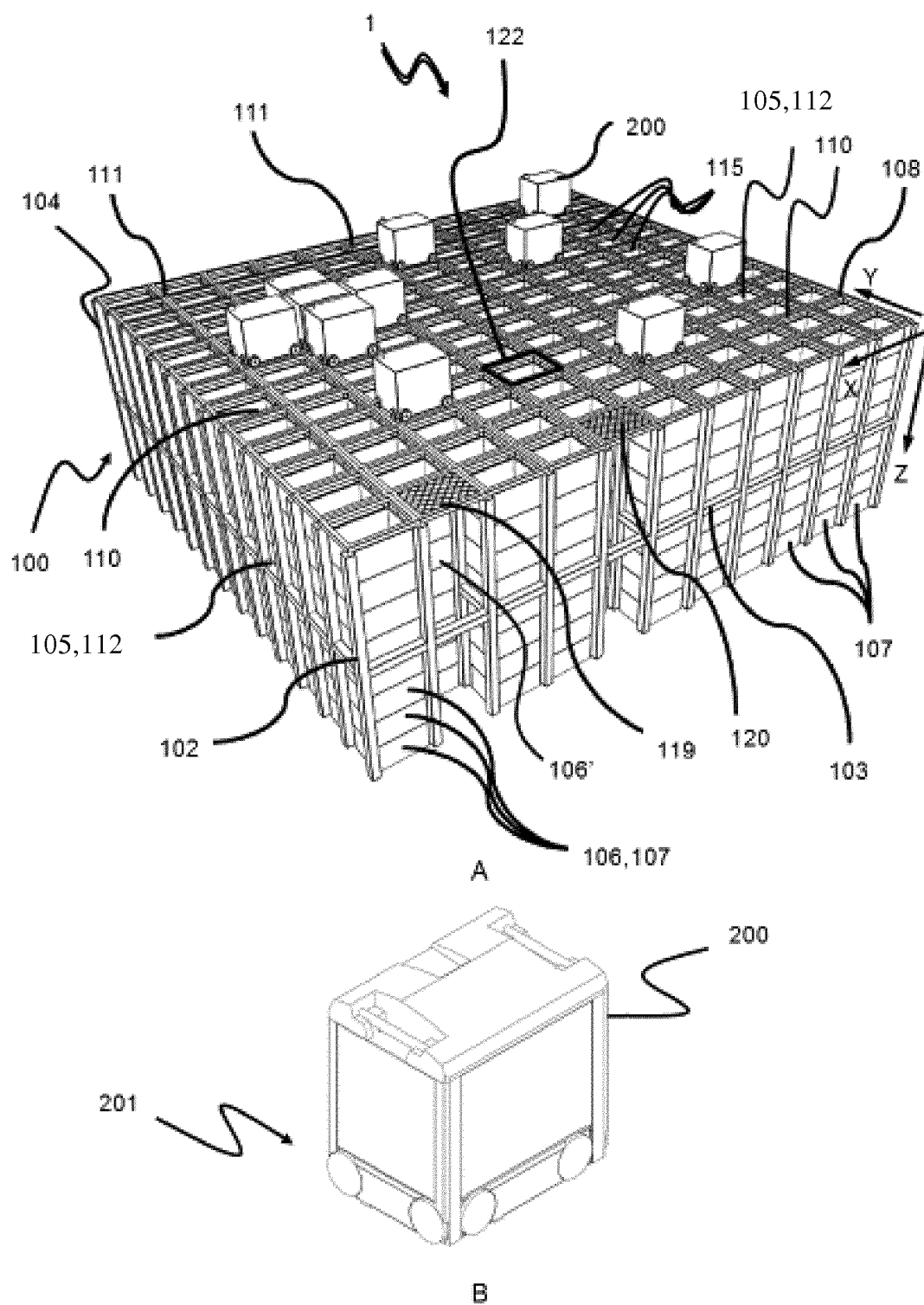

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the related methods as well, and vice versa.

Figure 2:
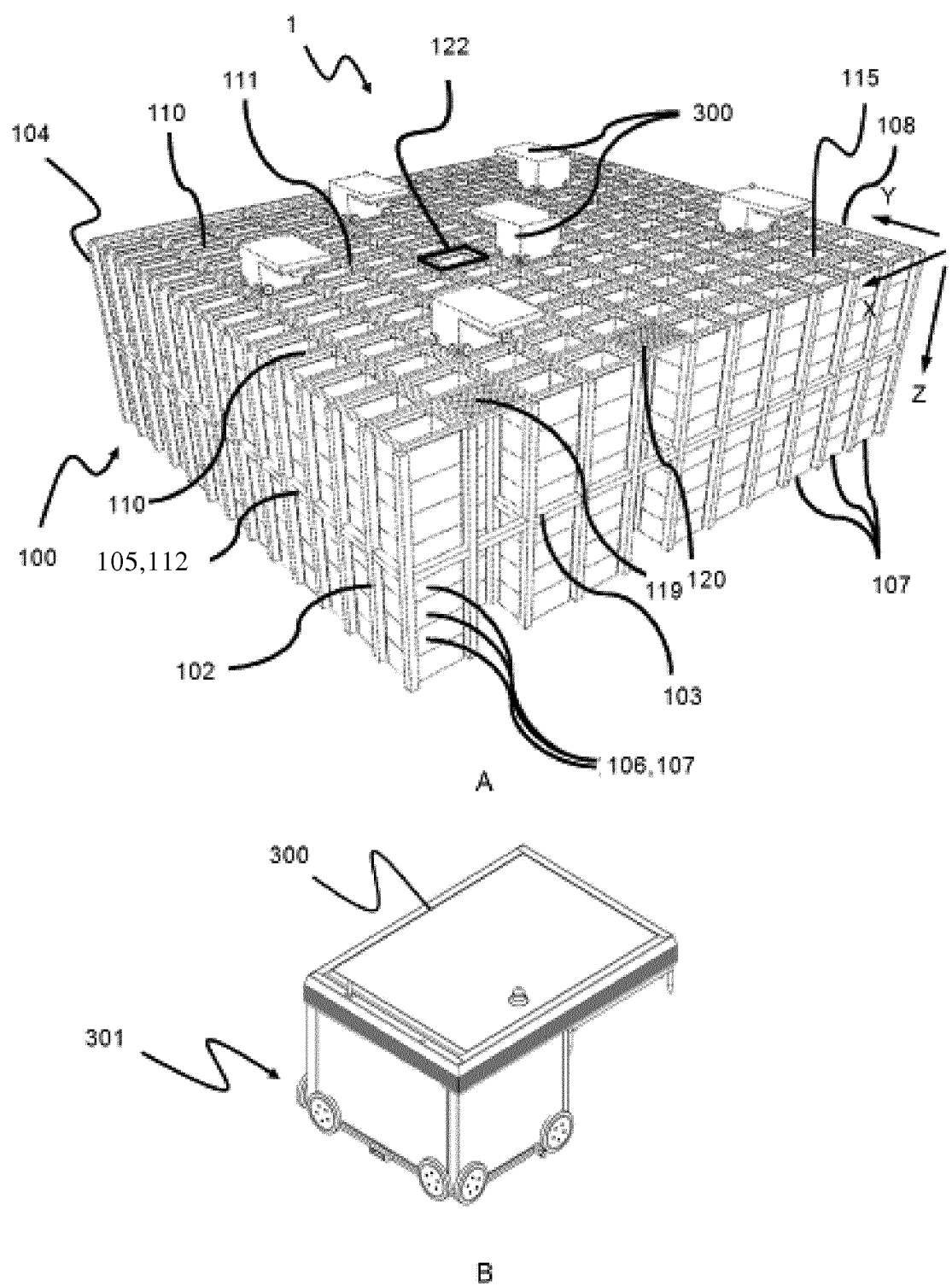
Figure 3:
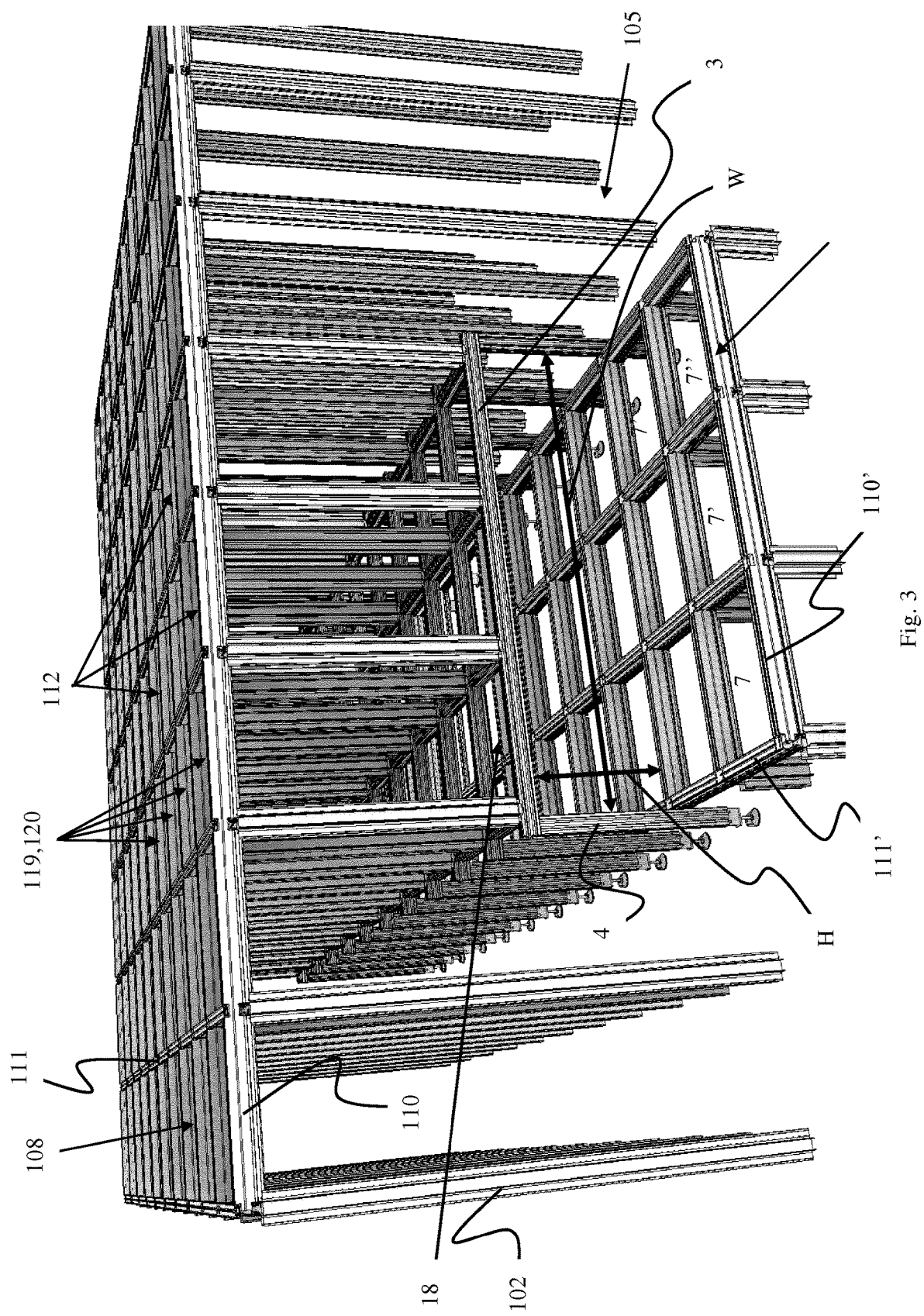
FIG. 3 is a perspective view of a first exemplary storage grid for use in a storage system according to the invention.
Figure 4:
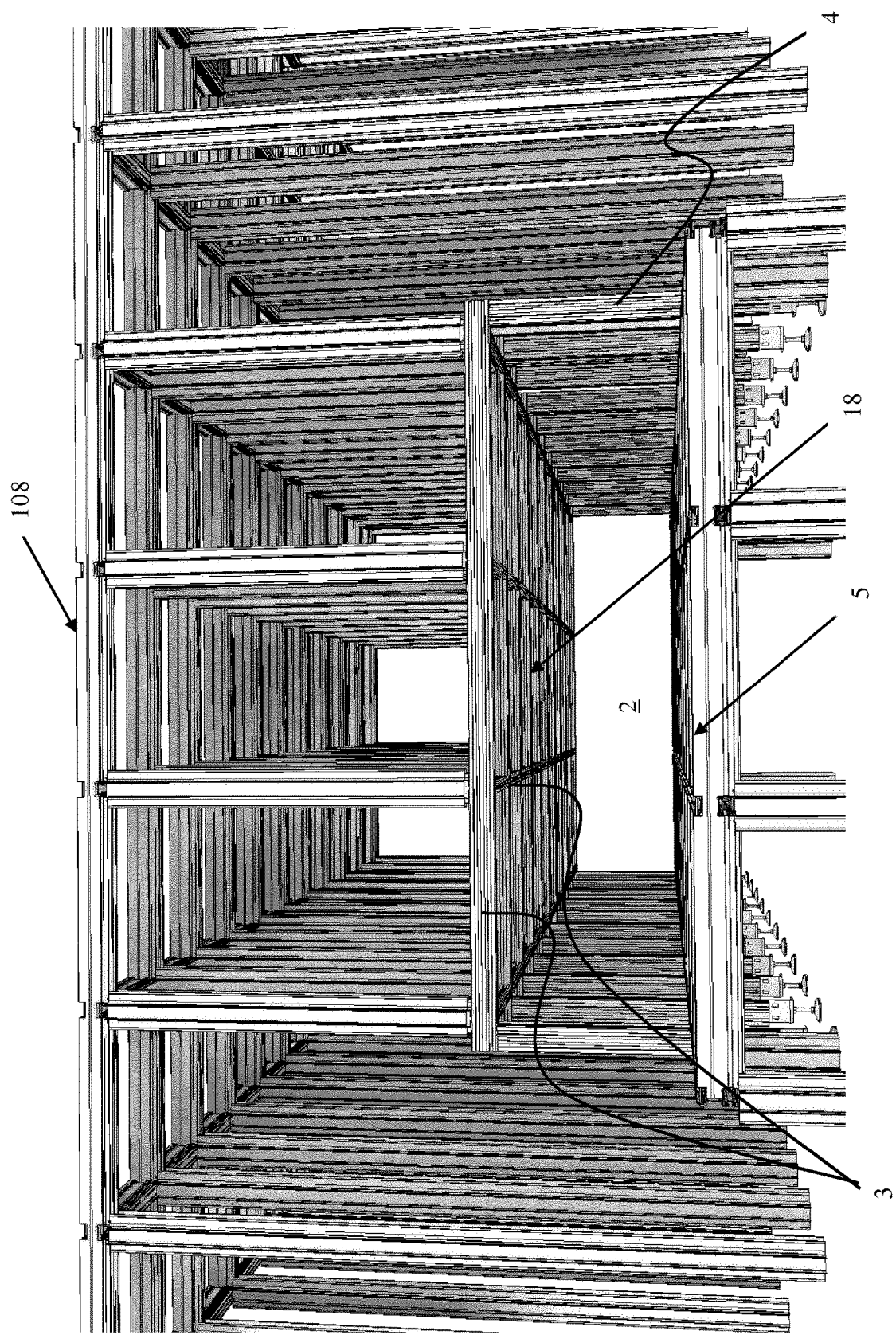
FIG. 4 is a perspective side view of the storage grid in FIG. 3.
Figure 5:
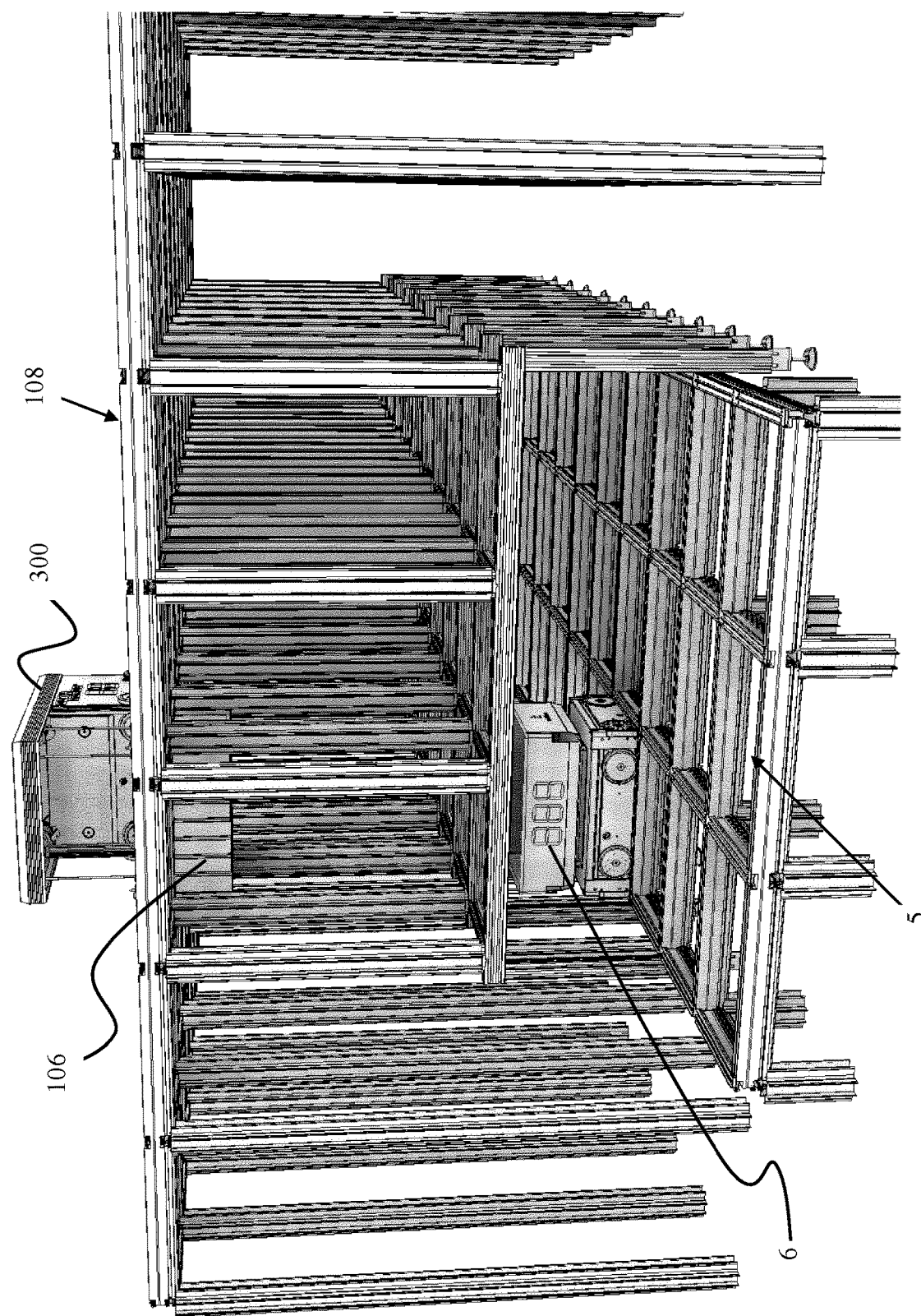
FIG. 5 is a perspective view of the storage grid in FIGS. 3 and 4, featuring a container handling vehicle and a container transfer vehicle.

An embodiment of a storage grid for an automated storage and retrieval system according to the invention is shown in FIGS. 3 and 4 and the same storage grid featuring a container handling vehicle 300 and a container transfer vehicle 6 is shown in FIG. 5. The number of storage columns of the grid is scaled down to better illustrate the features of the storage grid. The major part of the storage grid is constructed in the same manner as in the prior art systems shown in FIGS. 1A and 2A. That is, the storage grid structure 104 comprises vertical column profiles 102 defining multiple storage columns 105, in which storage containers 106 can be stored one on top of another in vertical stacks 107. The column profiles 102 are interconnected at their top ends by top rails 110,111 forming a horizontal rail grid 108 (hereinafter termed the top rail grid) upon which container handling vehicles 200,300 may move in two perpendicular directions.

In addition to the storage columns 105, the storage grid structure of the storage system comprises multiple transfer columns 119,120 through which storage containers may be transferred between the top rail grid 108 (i.e. the top level of the grid) and a transfer section 2 (or tunnel/passageway) extending within the storage grid structure at a level below the top rail grid. The transfer section extends from an opening in an external side of the grid structure 104 and below the multiple transfer columns 119,120. In an advantageous embodiment, especially in connection with large storage grids, the transfer section may extend to a substantially central position of the storage grid, and even pass all the way through the storage grid via a substantially central section of the storage grid structure 104, to reduce the distance a storage handling vehicle 200,300 must travel to reach a transfer column.

The transfer section 2 is defined or constructed by multiple horizontal ceiling profiles 3, vertical support profiles 4 and a section of a horizontal rail grid 5 (hereinafter termed a transfer rail grid). The ceiling profiles 3 providing a horizontal support grid 18. The height H of the transfer section 2 may be defined by the distance between a lowermost surface of a ceiling profile 3 and an upper surface of an opposing rail 110', 111' of the transfer rail grid 5, and the width W of the transfer section is defined by the distance between an inner surface of two support profiles 4 connected to a common ceiling profile 3. The multiple transfer columns 119,120 are defined by vertical column profiles extending from the top rail grid to the ceiling profiles 3. The height H of the transfer section 2 is sufficient to allow a container transfer vehicle 6 to travel within the transfer section 2 when carrying a storage container.

The ceiling profiles 3, and/or the support grid 18, are supported by the vertical support profiles 4 arranged at the periphery of the transfer section 2.

FIG. 5 shows a situation in which a storage container 106 is being transferred between a container transfer vehicle 6 and a container handling vehicle 300.

The transfer rail grid 5 in the transfer section 2 comprises rails 110',111' (i.e. transfer rails), similar to the rails 110,111 (i.e. top rails) of the top rail grid 108, upon which a container transfer vehicle 6 (or delivery vehicle) may move in two perpendicular directions. The container transfer vehicle 6, see FIGS. 14A and 14B for an embodiment of a suitable transfer vehicle, features a wheel base unit 22, see FIGS. 15A-15C, having a wheel arrangement. The wheel arrangement comprises a first set of wheels 32a enabling movement of the transport vehicle in a first direction and a second set of wheels 32b enabling movement of the transport vehicle in a second direction perpendicular to the first direction, allowing the vehicle to travel upon the transfer rail grid 5. On top of the wheel base unit 22 the container transfer vehicle 6 features a container carrier 38 for accommodating a storage container to be transferred. The disclosed container transfer vehicle 6 features a container carrier 38 in the form of a deep tray, in which a lower portion of a storage container 106 may be accommodated. However, numerous alternative solutions for suitable container carriers are envisaged and the main functional feature of all suitable containers carriers is the ability to receive a storage container being lowered on top of the container carrier and retain the storage container during movement of the container transfer vehicle upon the transfer rail grid 5. Further, the horizontal periphery of the container transfer vehicle 6 is preferably such that each of the multiple adjacent transfer columns 119,120 may be used to transfer a storage container 106 to a respective container transfer vehicle 6 simultaneously. To obtain the latter function, the horizontal periphery of the container transfer vehicle 6 fits within the horizontal area defined by one of the grid cells 122' of the transfer rail grid 5. Further, the transfer rails 110',111' extending in one of the two perpendicular directions are dual-track rails, see below, to allow multiple container transfer vehicles to be arranged adjacently below the multiple adjacent transfer columns 119,120.

The transfer section 2 has a width W providing room for three separate transfer vehicle paths 7, 7', 7" in a longitudinal direction of the transfer section. By having three separate transfer vehicle paths, three transfer vehicles 6 may pass each other at the same time. To allow this feature, at least the rails 111' extending in the longitudinal direction of the transfer section are dual-track rails. Suitable dual-track rails are disclosed in for example WO 2015/193278 A1 and WO 2015/140216 A1. A dual-track rail 110',111' comprises two parallel tracks. In other words, three parallel dual-track rails may provide two parallel transfer vehicle paths. The rails 110' arranged in a perpendicular direction relative the rails 111' extending in the longitudinal direction of the transfer section may be single-track rails or dual-track rails. In particular, when the storage grid structure 104 comprises multiple adjacent transfer columns 119,120, it may be advantageous that all rails 110',111' in the transfer rail grid 5 are dual-track rail as it provides an optimum flexibility for movement of the container transfer vehicles 6 to/from the positions below the transfer columns 119,120. The design of the transfer rails 110',111' and the wheel arrangement 32a, 32b of the container transfer vehicles 6 allows the vehicles to change tracks when needed, i.e. the container transfer vehicle 6 may move in two perpendicular directions upon the transfer rail grid 5. The wheel arrangement may preferably be similar to the ones described for the prior art container handling vehicles 200,300.

Figure 6:
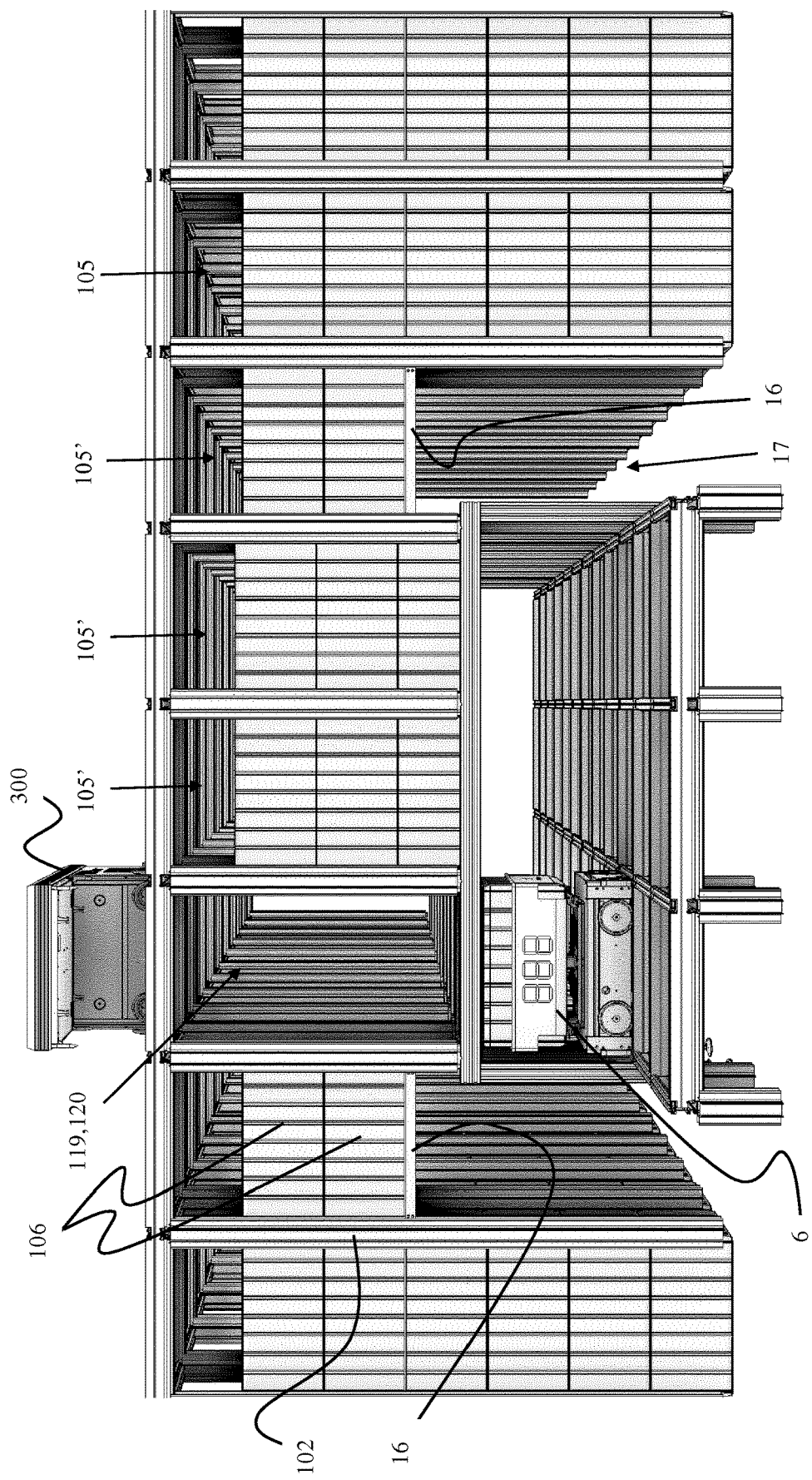
FIG. 6 is a perspective view of the storage grid in FIGS. 3 to 5, wherein the storage columns are stocked with storage containers.

Depending on the requirements of the storage system (i.e. the size of the storage grid, turnover of storage containers etc.) one or more of the transfer vehicle paths 7, 7', 7" are arranged below an optional number of transfer columns 119,120. The grid columns 112 arranged above the transfer section and not designated as transfer columns may be used as storage columns 105' (see FIGS. 6 and 12). This is achieved by adding stopper elements 16 (e.g. brackets fastened to the relevant column profiles) at the lower end of the respective grid columns 102 (the stopper elements in the storage columns 105' arranged above the transfer section 2 is not visible in the drawings). The stopper elements 16 are designed to support a storage container 106 being lowered into the respective grid column 112 and prevent it from entering the transfer section 2 below. In this manner a minimum of potential storage space is lost from the storage grid structure 104 due to the transfer section 2. The stopper elements 16 may also be used to provide an operator passage 17 below a row of storage columns 105' adjacent to the transfer section 2. In this manner, an operator or service person may access a container transfer vehicle 6, for instance in case of a failure preventing the vehicle from exiting the transfer section.

The transfer rail grid 5 extends out of the storage grid structure 104 and depending on the design and extent of the transfer rail grid 5, the container transfer vehicles 6 may be used to transfer storage containers 106 between multiple separate storage grid structures, transfer containers from a storage grid to a picking/stocking stations, transfer to dedicated stocking zones, transfer to an assembly line for delivery of parts, etc.

Figure 7:
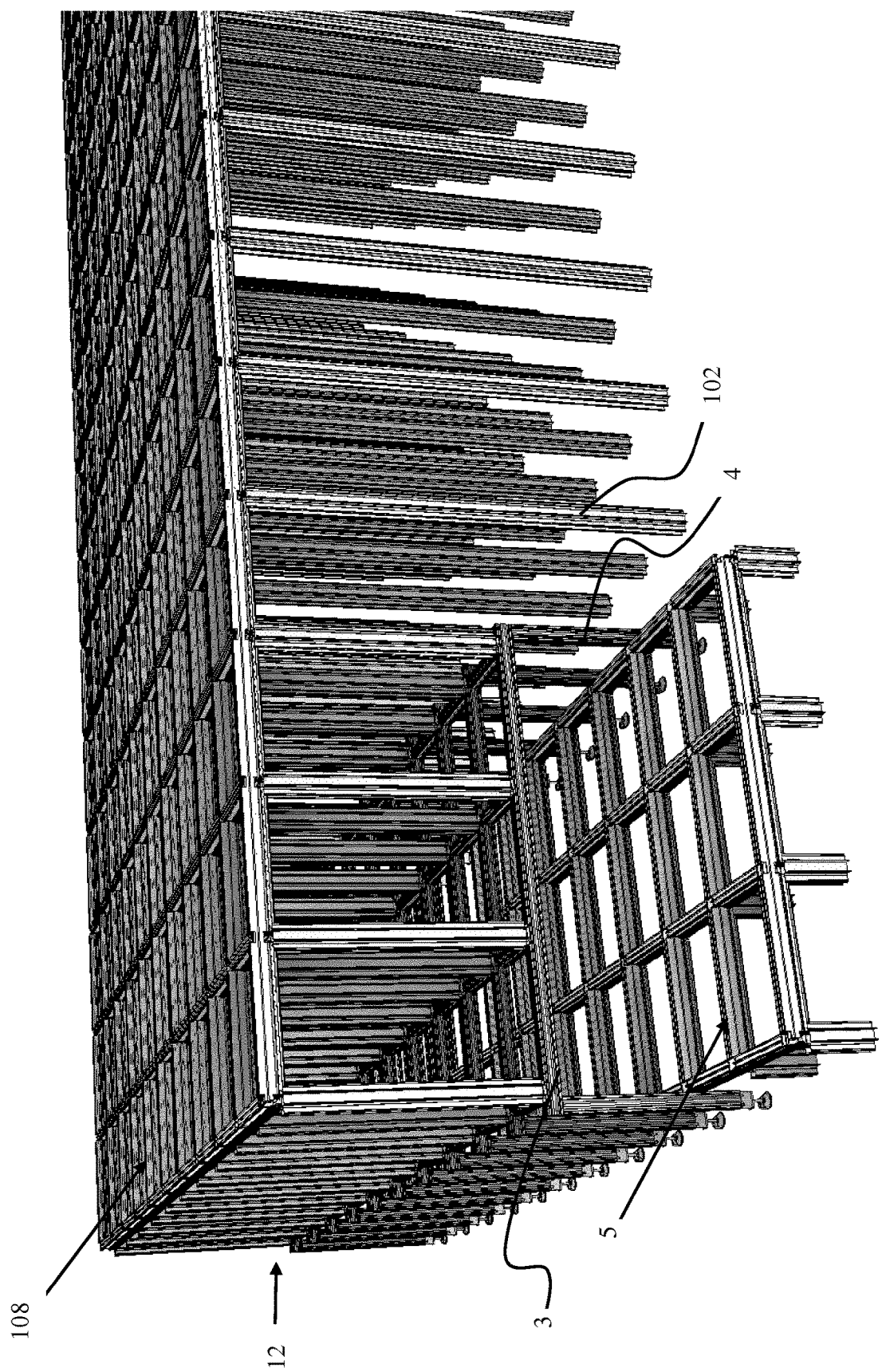
FIG. 7 is a perspective view of a second exemplary storage grid for use in a storage system according to the invention.
Figure 8:
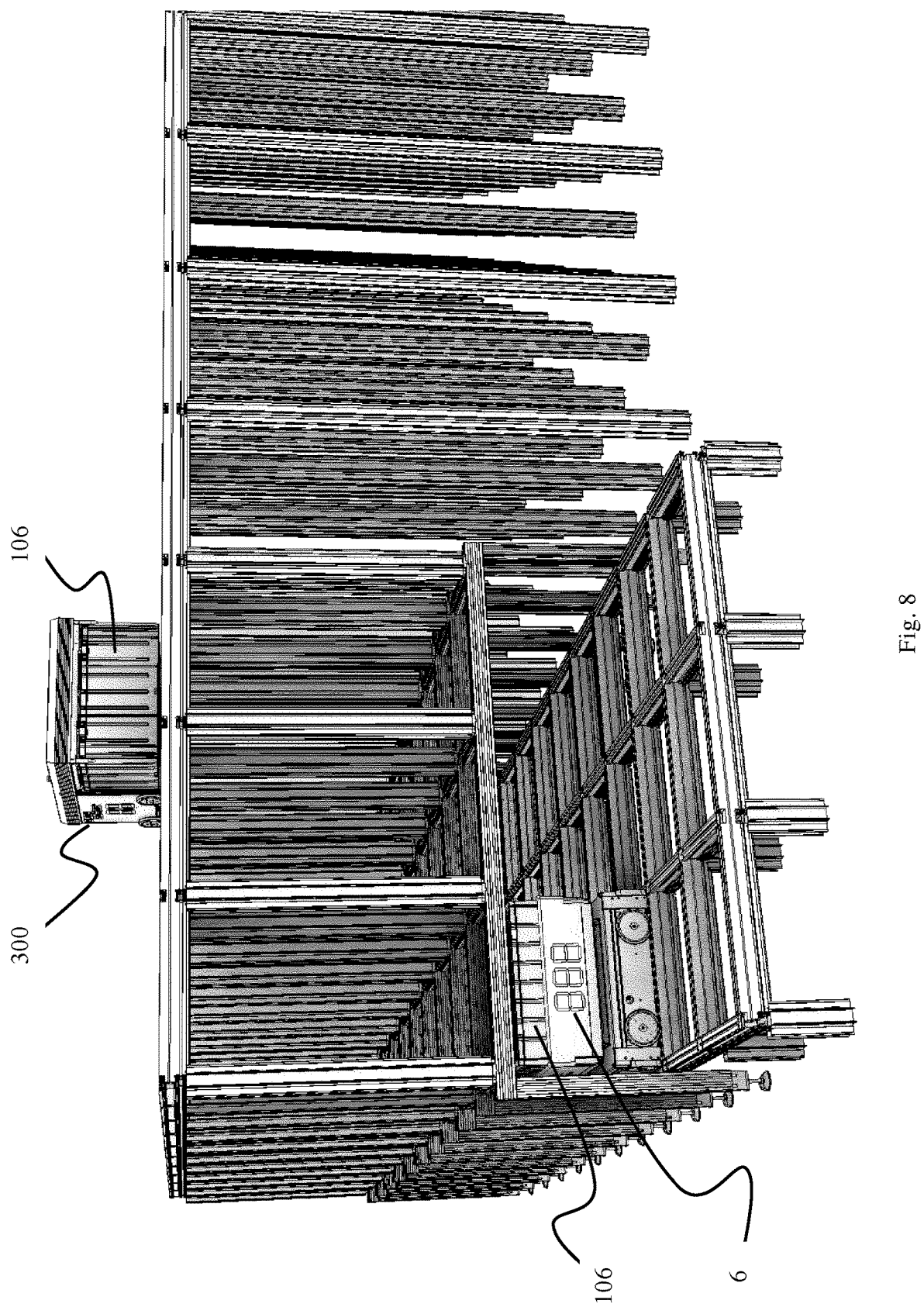
FIG. 8 is a perspective view of the storage grid in FIG. 6, featuring a container handling vehicle and a container transfer vehicle.

A second embodiment of the storage grid 104 for an automated storage and retrieval system according to the invention is shown in FIGS. 7 and 8. In this embodiment, the differentiating feature in view of the embodiment discussed above is that the transfer section 2 is arranged along or adjacent an external side section 12 of the storage grid 104.

Figure 9:
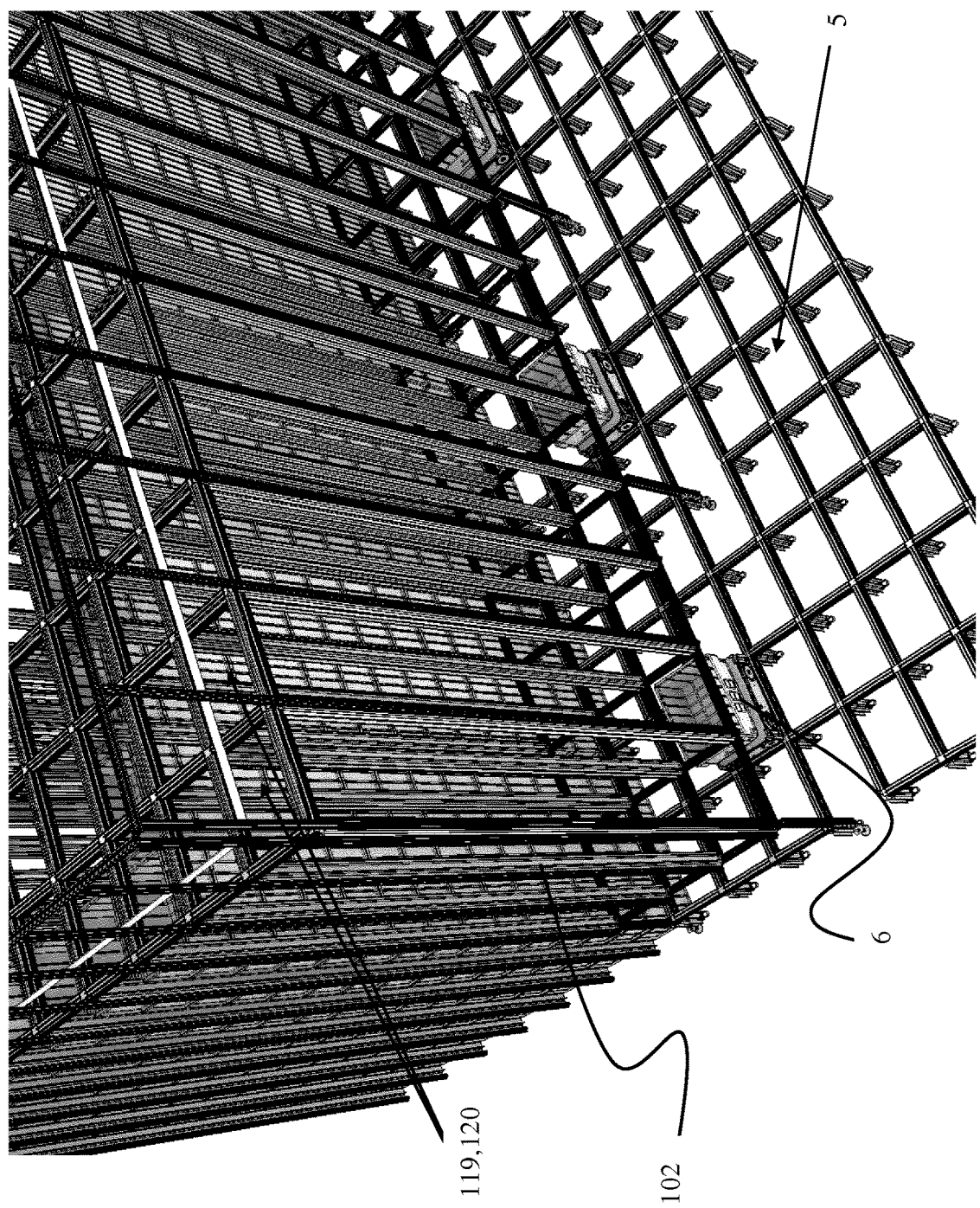
FIG. 9 is a perspective top view of a third exemplary storage grid for use in a storage system according to the invention.
Figure 10:
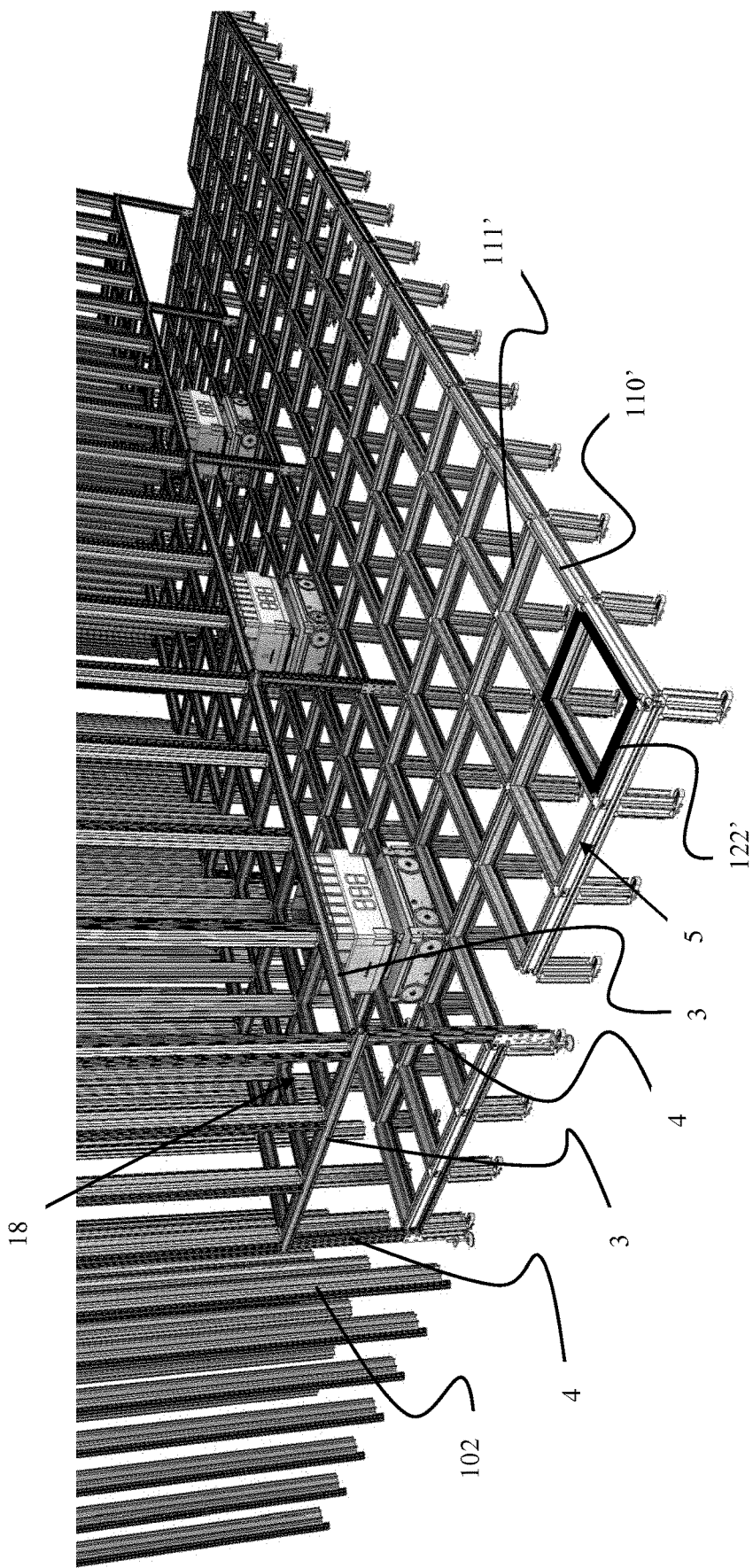
FIG. 10 is a perspective side view of a third exemplary storage grid for use in a storage system according to the invention.

A third embodiment of the storage grid 104 for an automated storage and retrieval system according to the invention is shown in FIGS. 9 and 10. The main differentiating feature of the third embodiment in view of the embodiments discussed above is the construction of the support grid 18 allowing the container transfer vehicles to exit/enter the transfer section via the longitudinal side of the transfer section.

The preferred arrangement and size of the transfer section 2 in any given storage system, as well as the positioning of the transfer columns 119,120, will depend on the size of the storage grid structure 104, the intended use of the storage system 1, the available space in which the storage system is arranged, the shape/layout of said space, etc. Independent of the specific positioning of the transfer section 2 within the storage grid structure, the storage system according to the invention will provide a number of advantages in view of the prior art storage systems, as disclosed throughout the present specification.

Figure 11:
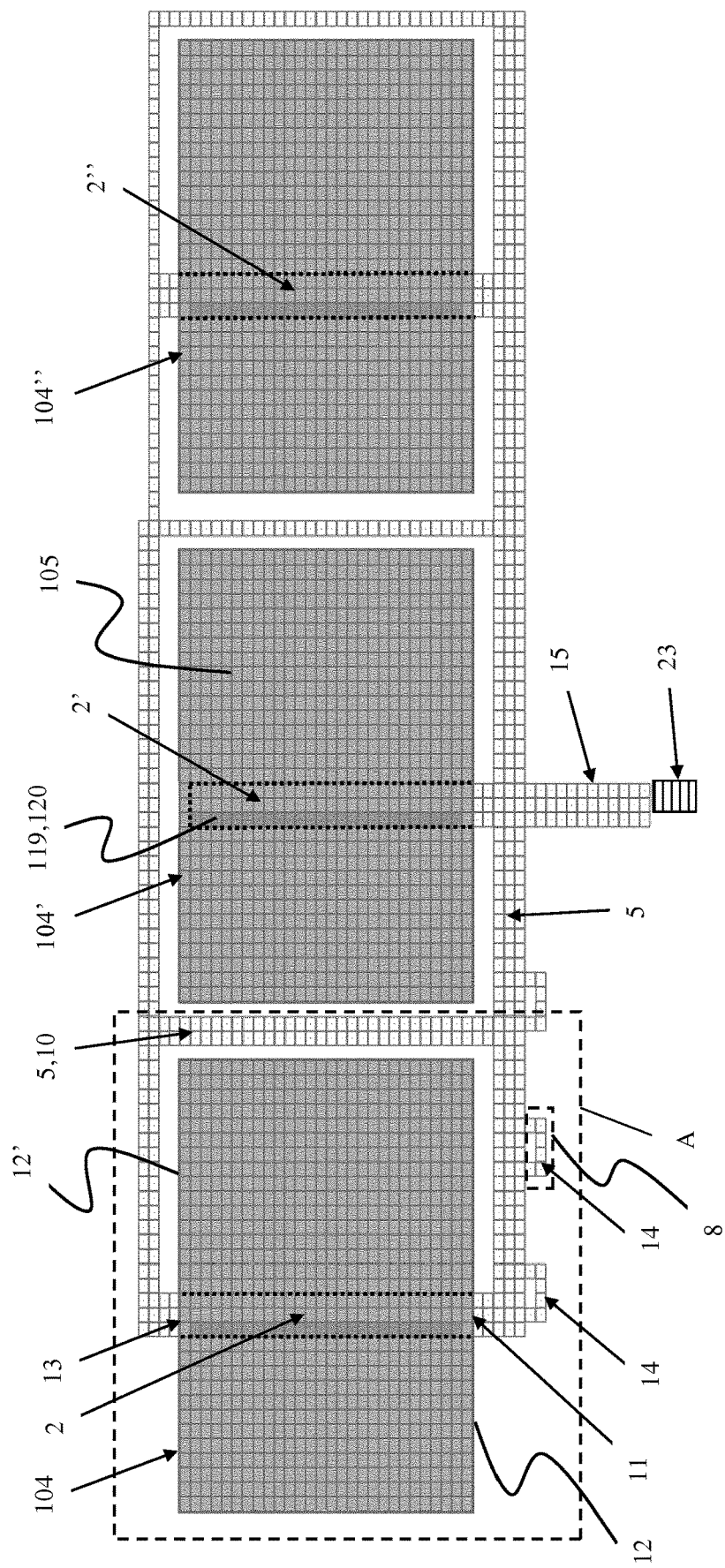
FIG. 11 is a schematic top view of an exemplary storage system according to the invention.
Figure 12:
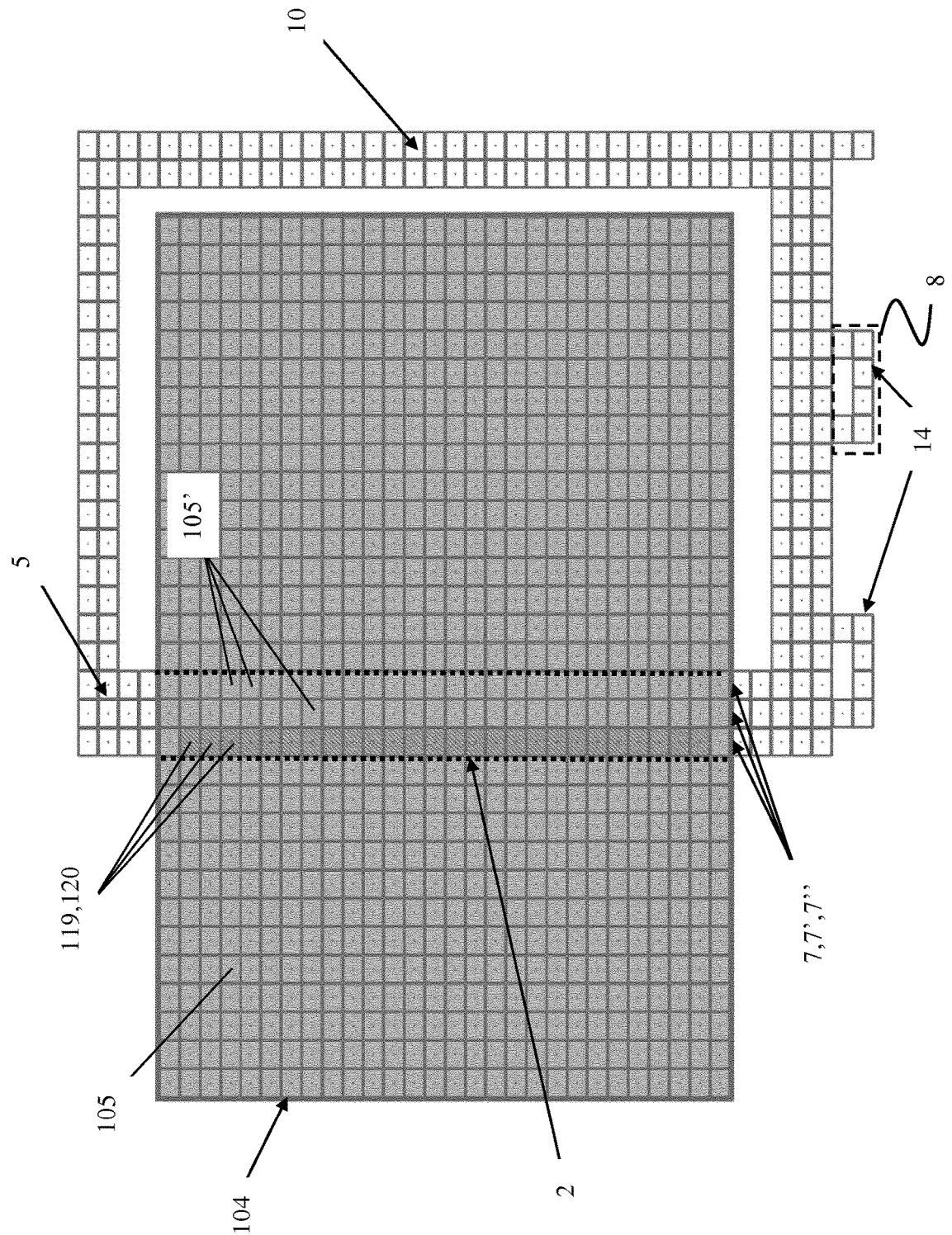
FIG. 12 is a detailed view of a section of the storage system in FIG. 8.

A schematic overview of an exemplary layout of an exemplary storage system 1 is shown in FIGS. 11 and 12. The exemplary layout illustrates some of the many advantages of the storage system.

The storage system in FIG. 11 comprises three separate storage grid structures 104, 104', 104". Each of the first and the third storage grid structures 104,104" features a transfer section 2,2" extending through the whole respective storage grid structure, i.e. the transfer sections extend from a first opening 11 in an external side 12 of the storage grid to a second opening 13 in an opposite external side 12'. In this manner, a container transfer vehicle 6 having received or delivered a storage container 106 via any of the multiple transfer columns 119,120 may exit the first 11 or the second opening 13 of the transfer section 2 depending on which pathway to a selected destination is most efficient.

Each of the transfer sections 2,2',2" features three transfer vehicle paths 7, 7', 7", see FIG. 9. The first vehicle path 7 is arranged below multiple adjacent transfer columns 119,120, through which storage containers 106 may be transferred between the top rail grid 108 and a container transfer vehicle 6. The second and third vehicle paths 7',7" are arranged below multiple storage columns 105' and are predominantly used by the container transfer vehicles 6 to travel within the transfer section to or from a transfer column 119,120. The transfer section 2' in the second storage grid 104' does not extend all the way through the storage grid, and a container transfer vehicle 6 will always enter and exit the transfer section via the first opening.

Figure 13:
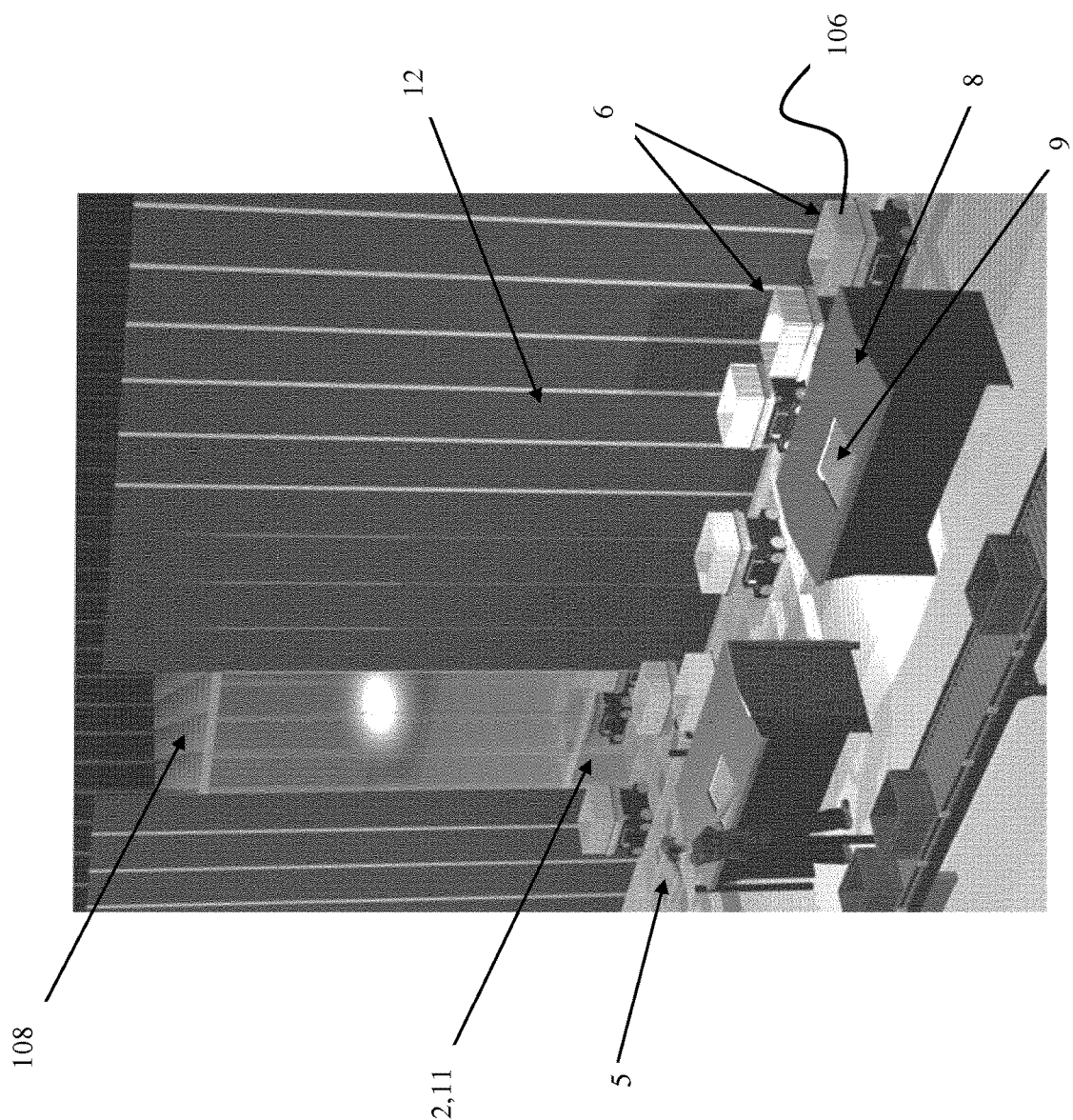
FIG. 13 is a perspective view of a storage system according to the invention.

The transfer grid 5 interconnects the transfer columns 119,120 of the first storage grid 104 with transfer columns 119,120 of the second and third storage grid 104', 104", with rail loops/circuits 14 (that may for instance be arranged at a picking/stocking station, see FIG. 13), with a multi-use transfer grid area 15 and any other destination to which the transfer of a storage container is desired. The multi-use transfer grid area 15 may for instance be used for stocking large amounts of new items to the storage grid, as temporary parking for transfer vehicles carrying storage containers comprising high-demand items, as a loading area for storage containers to enter the storage grids or may be arranged at a station for loading off pallets and/or packaging boxes with items picked from the storage system. To improve the efficiency of transporting goods/items between a picking/stocking station and the multi-use transfer grid area 15, a dedicated transport vehicle may advantageously be used, see description below of the embodiments shown in FIGS. 16-18.

Use of an area or section of the transfer grid 5 to accommodate container transfer vehicles 6 carrying storage containers 106 comprising high-demand items, i.e. a parking section of the transfer grid, provides for a highly efficient method of retrieving items that have a very high picking rate, i.e. that have a particularly high turnover. In prior art systems such high turnover items entail that the specific storage container(s) in which these items are stored is transferred back and forth between a storage column 105 and a picking/stocking station more or less continuously. In the inventive storage system, items having a particularly high turnover may permanently (or at least intermediately) be stored in a storage container arranged on a transfer vehicle 6. In this manner, high turnover items may be accessed in a very short time, crowding at the transfer columns are further minimized and unnecessary use of the container handling vehicles 200,300 are avoided.

The schematic overview in FIG. 12 shows details of the first storage grid 104 in FIG. 11 but may also illustrate an alternative layout of a storage system comprising a single storage grid 104.

FIG. 13 discloses an embodiment of an inventive storage system having a layout substantially as shown in FIG. 12. The storage system features two picking/stocking stations 8, wherein each is arranged such that a container transfer vehicle 6 may pass beneath a container access opening 9 arranged in the picking/stocking station while moving on the transfer rail grid 5. In other words, the picking/stocking stations 8 are arranged such that a container transfer vehicle 6 may pass through the picking/stocking station via rail loops 14 as shown in FIGS. 11 and 12. Thus, a storage container 106 containing an item to be picked (or a storage container into which an item is to be stocked) is first retrieved by a container handling vehicle 200,300 arranged on the top rail grid 108, lowered to a container transfer vehicle 6 positioned inside the transfer section 2 beneath a suitable transfer column 119,120, and transported by the container transfer vehicle 6 to a picking/stocking station 8, wherein the transfer vehicle stops at a position beneath the container access opening 9 to allow an operator to pick the item.

The storage system 1 shown in FIGS. 11 and 12, features three laterally separated storage grid structures 104, 104', 104'' arranged at the same level. However, it is also envisioned that the storage system may comprise storage grid structures separated in a vertical direction, e.g. stacked on top of each other. When separated in the vertical direction, the transfer rail grid of the storage system may for instance comprise a container transfer vehicle lift for lifting a container transfer vehicle between separate levels of the transfer rail grid, such that a container transfer vehicle may access all areas of the transfer grid.

In the disclosed embodiments, the transfer section 2 comprises a section of the transfer rail grid 5 featuring three parallel vehicle paths 7,7',7'' allowing three transfer vehicles 6 to pass each other at the same time. However, many of the advantages of the present inventive storage system may also be obtained by use of a transfer section 2 comprising at least one vehicle path provided the track is arranged below at least one transfer column 119,120.

In the disclosed embodiments, the transfer rails 110',111' of the transfer rail grid 5 are dual-track rails identical to the rails 110,111 of the top rail grid. This feature is advantageous in a cost perspective since the number of different parts used in constructing the storage grid structure 104 is minimized. Further, it allows for the use of transfer vehicles 6 having a wheel arrangement similar to the one used in the container handling vehicles 200,300, a feature which significantly simplifies the overall system cost. However, the main advantages of the inventive storage system and storage grid structure, e.g. a highly flexible and efficient transfer of storage containers in and out of the storage grid, as well as the avoidance of single point of failures disrupting the operation of the storage system, may also be obtained by embodiments of the invention, wherein the transfer rails of the transfer rail grid 5 are different from the rails of the top rail grid 108. An important feature for avoiding a single point of failure is that the container transfer vehicles may pass each other and move in two perpendicular directions upon at least the section of the transfer rail grid arranged in the transfer section. This feature allows the container transfer vehicles to pass around for instance a non-functioning container transfer vehicle which would otherwise have caused an interruption of the storage system operation. The presence of multiple transfer columns may further minimize any risk of a single point of failure disrupting the operation of the storage system.

It is noted that the dimensions of the grid cells 122 (see prior art system in FIGS. 1A and 2A and the relevant prior art description) of the top rail grid 108 are preferably similar or identical to the dimensions of the grid cells 122' (see FIG. 10) of the transfer rail grid 5. Having the grid cells of similar dimensions allows for an optimum use of the inventive storage system by allowing adjacent transfer columns to be used simultaneously.

Although the use of dual-track rails 110',111' in at least one direction of the transfer rail grid 5 provides several advantages with regards to for instance space efficiency by allowing container transfer vehicles 6 to pass each other at adjacent grid cells 122', an advantageous storage system may also be obtained by having a transfer grid comprising only single-track rails. Use of only single-track rails would, however, require a larger transfer grid to allow container transfer vehicles 6 passing each other, as compared to dual-track rails, since such a grid would not allow the container transfer vehicles 6 to pass each other on adjacent grid cells 122'. For instance, the dual-track transfer rails 110',111' of the transfer grid 5 disclosed in FIGS. 3 and 5 could be replaced by single-track rails. In that case, two container transfer vehicles 6 would still be able to pass each other upon the transfer grid 5, for instance by having one of the container transfer vehicles travelling on vehicle path 7 and the other on vehicle path 7'''.

The automated storage and retrieval system shown in FIGS. 3-13 is more effective than prior art systems by avoiding or at least reducing congestion of container handling vehicles at the transfer columns. Further advantages of the storage system include increased availability of a transfer column for container handling vehicles operating on top of the storage grid and reduced vulnerability to single point of failure events that may disrupt the operation of the storage system. The storage system is also highly flexible in that the storage container transfer capacity, as well as the purpose/ function of the storage container handling system, can easily be increased or modified after installation.

Figure 16:
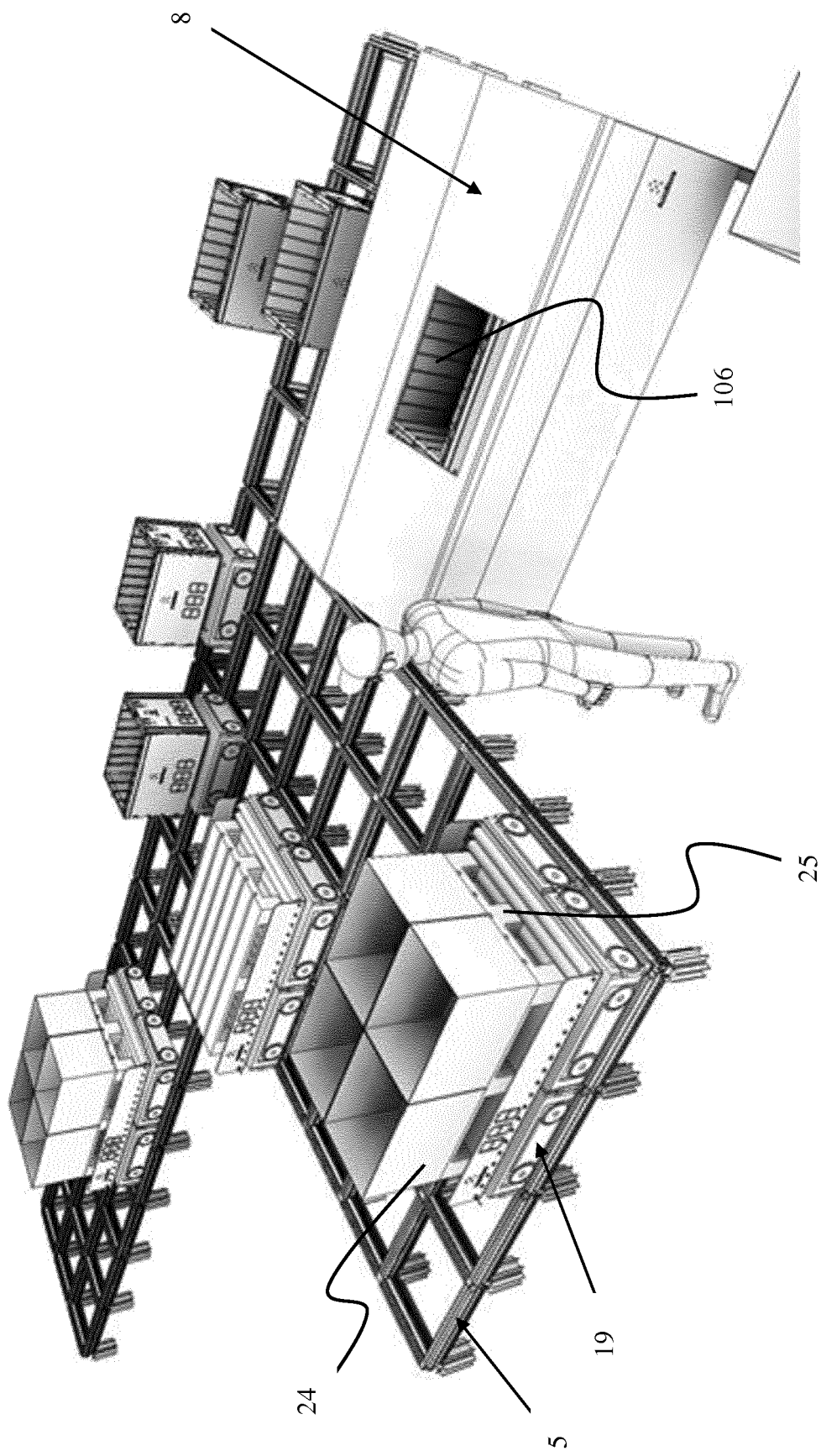
FIG. 16 is a perspective view of an exemplary storage system according to the invention.
Figures 17A, 17B:
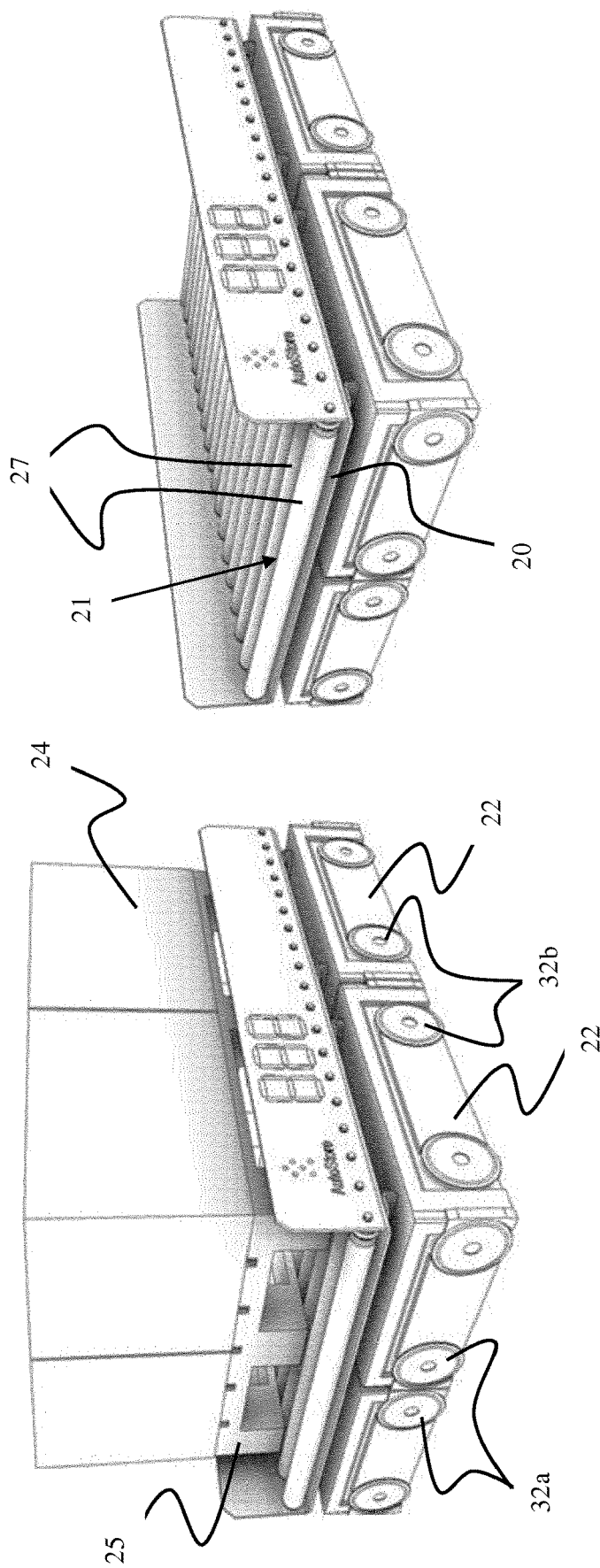
FIGS. 17A-17D are perspective views of a first exemplary transport vehicle.
Figures 17C, 17D:
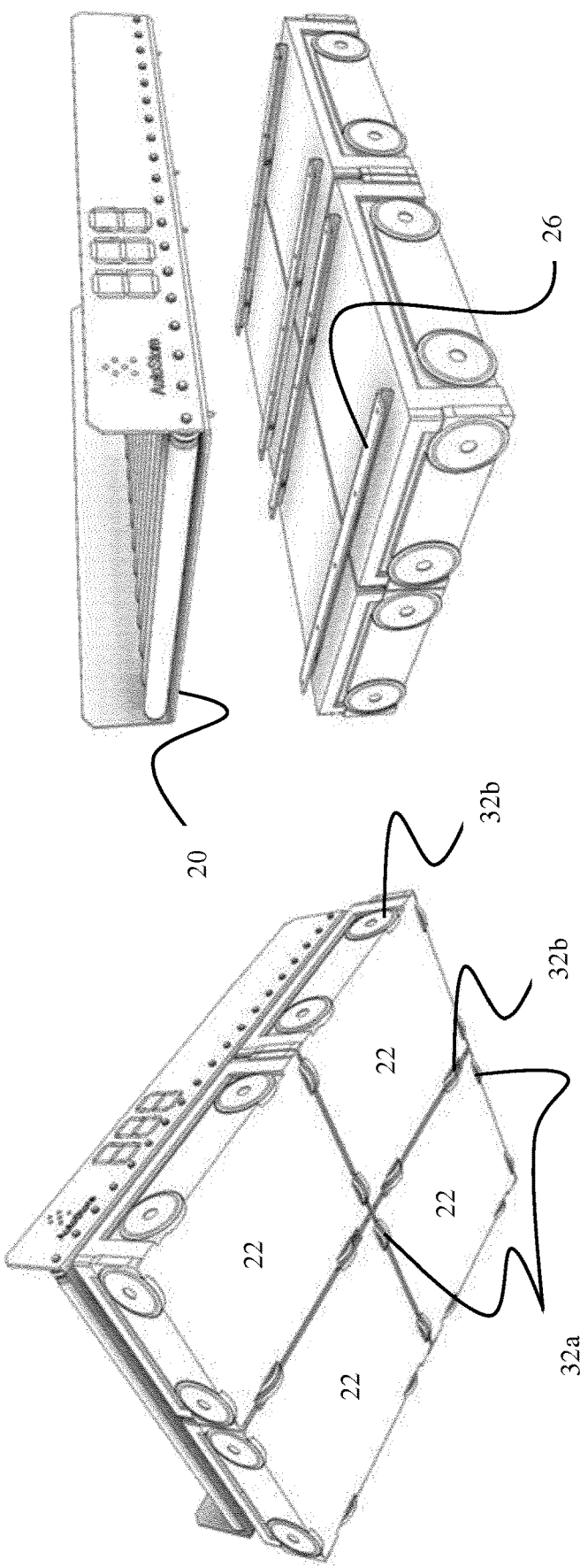

An advantageous transport system for obtaining an efficient transport of items between the picking/supply station 8 and an unloading/loading assembly 23 is shown in FIG. 16. The exemplary unloading/loading assembly 23 is shown schematically in FIG. 11 and features a conveyor for transporting boxes or pallets to and/or from the multi-use transfer grid area 15.

In prior art systems, items to be retrieved from the storage grid 104 are picked from the relevant storage containers 106 by an operator at a picking/supply station and transferred to packaging boxes 24. The packaging boxes 24 are often arranged on a pallet 25, which the operator subsequently transports to the unloading/loading assembly 23. At the unloading/loading assembly 23, the packaging boxes 24/pallet 25 are for instance loaded onto a truck for transport to customers, shops etc. The efficiency of the process of picking items, packing them in boxes and transferring them to an unloading/loading station is not optimized. In particular, the process requires that the operator use valuable time in transporting the packaging boxes/pallet from the picking/supply station to the unloading/loading assembly.

To provide an efficient transport of items between the picking/supply station 8 and an unloading/loading assembly 23, the disclosed transport system features a transport vehicle 19 running on a transfer grid 5 extending between the picking/supply station 8 and the unloading/loading assembly 23. The transfer grid 5 of the transport system may comprise any of the features described above for the transfer grids 5 shown in FIGS. 3-13.

The transport vehicles shown in FIG. 16, as well as FIGS. 17A-17D, features four wheel base units 22 providing a wheel arrangement having a first set of wheels 32a enabling movement of the transport vehicle in a first direction and a second set of wheels 32b enabling movement of the transport vehicle in a second direction perpendicular to the first direction upon the transfer grid 5.

A carrier platform 20 having a conveyor system 21 may be arranged on top of the wheel base units 22, as shown. The carrier platform 20 may be sized to support four packaging boxes 24 and/or a pallet 25, i.e. the area of the carrier platform is substantially equal to the footprint of four storage containers arranged two by two in such an embodiment. In the disclosed storage system, the storage containers may preferably have a width of 449 mm and a length of 649 mm. The preferred dimensions entail that a carrier platform having an area substantially equal to the footprint of four storage containers arranged two by two may accommodate a EUR 1 pallet.

In the exemplary embodiment, the conveyor system 21 is made up of multiple rollers 27, but other conveyor systems, such as belt or chain conveyors, may also be used. The conveyor system 21 is advantageous in that it allows the packaging boxes and/or pallet arranged on the carrier platform 20 to be moved off the transport vehicle onto the conveyor of the unloading/loading assembly 23. However, in alternative embodiments of the transport vehicle, the carrier platform may also be without a conveyor system provided the unloading/loading assembly features a lift device (e.g. a pallet jack) arranged to remove packaging boxes 24 or a pallet 25 from the carrier platform.

The wheel base units 22 of the exemplary transport vehicle 19 are similar to the wheel base units 22, see FIGS. 15A-15C, of the transfer vehicles 6 described above. Each wheel base unit 22 features a first set of wheels 32a enabling movement of the wheel base unit in a first direction and a second set of wheels 32b enabling movement of the wheel base unit in a second direction perpendicular to the first direction upon the transfer grid 5. In the exemplary wheel base unit, the second set of wheels 32b is connected to an arrangement for moving the second set of wheels in a vertical direction relative to the first set of wheels. The arrangement features wheel connecting plates 28 on opposite sides of the wheel base unit 22 and a displacement arm assembly 29 for moving the wheel connecting plates 28, and consequently the second set of wheels, in a vertical direction. Each set of wheels 32a,32b of the wheel base unit comprises two pairs of wheels arranged on opposite sides of the wheel base unit.

In the exemplary embodiment, the wheel base units 22 are adjacently connected by multiple connecting profiles 26 and the carrier platform 20 connected to the connecting profiles. Alternative solutions for connecting the wheel base units are also possible and envisaged herein.

Figure 18B:
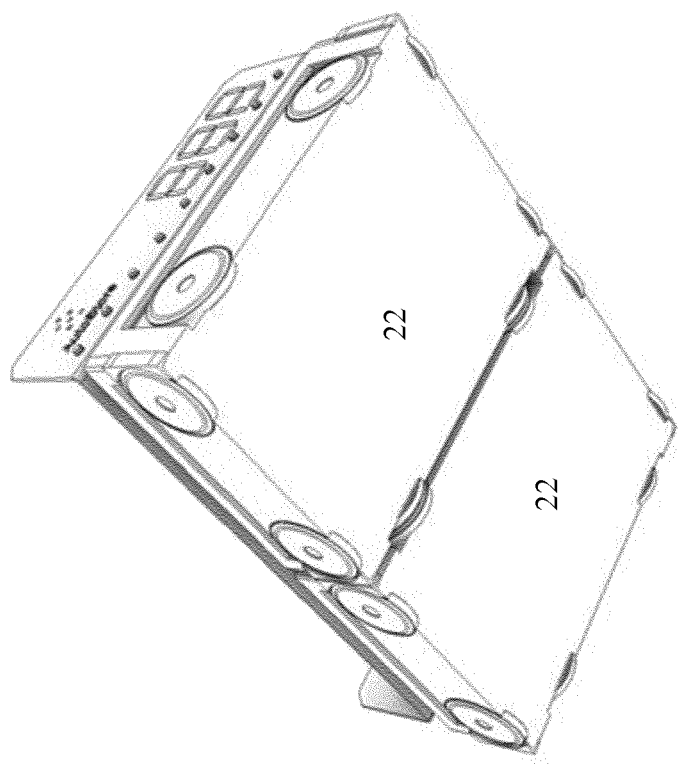
FIGS. 18A and 18B are perspective views of a second exemplary transport vehicle.
Figure 18A:
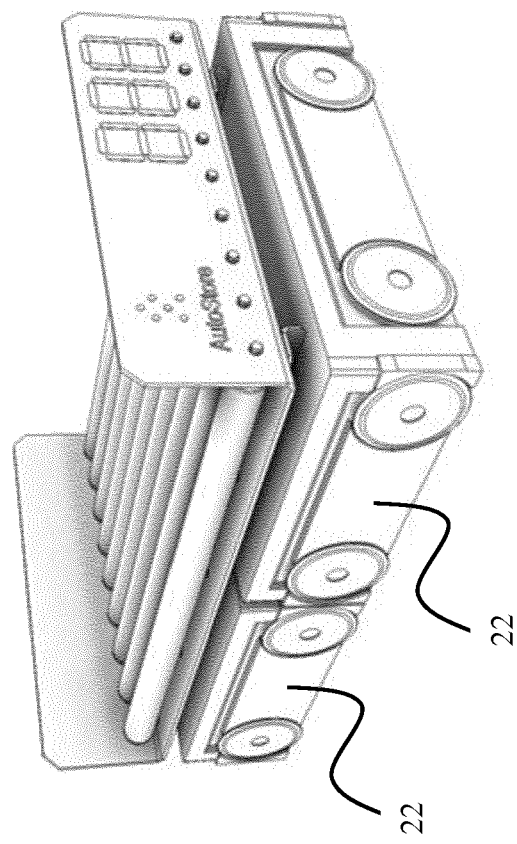

An advantage of having a transport vehicle 19 made up of multiple wheel base units 22 is that a desired size and transport capacity may easily be achieved by varying the number of wheel base units. A further exemplary transport vehicle 19' having two wheel base units is shown in FIGS. 18A and 18B.

A further advantage of having the transport vehicle 19 made up of multiple wheel base units 22 is that the transport vehicle is not only supported by the wheels along its periphery but also supported and driven by wheels along a centreline of the vehicle. This feature provides a high capacity transport vehicle 19 without requiring any further reinforcement of the wheels or drive motors to compensate for the increased load.

The transport system in FIG. 16 is disclosed with a picking/supply station 8 and transfer vehicles 6 for transferring storage containers between the storage grid and the picking/supply station. However, the transport system is not dependent on the transfer vehicles 6 and a transfer section 2 as discussed in connection with FIGS. 3-13 and may alternatively comprise a prior art picking/supply station arranged to receive storage containers 106 directly via a transfer column 119,120 without the use of a transfer vehicle 6. Exemplary prior art picking/supply stations suitable for the present transport system are disclosed in for instance WO 2012/026824 A1. In alternative embodiments, wherein a storage system comprising the transport system does not feature container transfer vehicles 6, the multi-use transfer grid area 15 may simply be termed a transfer grid area as it is not used for the various operations requiring the container transfer vehicles.

In addition to providing a highly efficient transport of items from the picking/supply station to the unloading/loading assembly, the disclosed transport system is also highly efficient for restocking the storage system with new items brought to the storage system facility on pallets and/or in packaging boxes. The transport system may advantageously also be used for loading new storage containers into the storage grid structure and retrieving used storage containers (e.g. worn out storage containers to be replaced) from the storage grid structure.

The disclosed storage system provides a highly flexible container transfer and handling solution. Not only does the present solution facilitate the transfer of storage containers to or from the storage grid structure of an automated storage system, but it also provides for a simple and efficient solution for transfer of storage containers between separate storage grids, as well as between a storage grid and any location for further handling or processing of the storage containers and/or their content. The container handling capacity of the storage system may easily be extended, and/or the function repurposed to accommodate any future changes in the requirements of a completed storage system.

REFERENCE NUMERALS

1 Storage system
2 Transfer section
3 Horizontal ceiling profile
4 Vertical support profile
5 Transfer rail grid
6 Container transfer vehicle
7 Transfer vehicle path
8 Picking/stocking station
9 Container access opening
10 Rail circuit
11 First opening (in an external side of a storage grid)
12 An external side of a storage grid
13 Second opening (in an external side of a storage grid)
14 Rail circuit
15 Multi-use transfer grid area
16 Stopper element
17 Operator access passage
18 Support grid
19 Transport vehicle
20 Carrier platform
21 Conveyor assembly
22 Wheel base unit
23 Unloading/loading assembly
24 Packaging box
25 Pallet
26 Connecting profile/beam
27 Rollers
28 Wheel connecting plate
29 Displacement arm assembly
32a,32b Wheel arrangement of wheel base unit
32a First set of wheels of wheel base unit
32b Second set of wheels of wheel base unit
38 Container carrier
100 Framework structure
102 Upright members of framework structure, i.e. vertical column profiles
103 Horizontal members of framework structure
104 Storage grid, storage grid structure
105 Storage column
105' Storage column arranged above a transfer section
106 Storage container
107 Stack
108 Top rail grid, rail system
110 First set of parallel rails in first direction (X), top rails
111 Second set of parallel rails in second direction (Y), top rails
110' Transfer rails, in a first direction of a transfer rail grid
111' Transfer rails, in a second direction, perpendicular to the first direction, of a transfer rail grid
112 Grid column
115 Grid opening
119 Transfer column,
120 Transfer column
122 Grid cell
200 Prior art container handling vehicle
201,301 Wheel arrangement
300 Second container handling vehicle
X First direction
Y Second direction
Z Third direction

The invention claimed is:

1. A storage system comprising a storage grid structure having a top rail grid upon which container handling vehicles work to store and retrieve storage containers in and from storage columns beneath the top rail grid,
wherein the storage system comprises multiple transfer rails forming a horizontal transfer rail grid arranged at a level below the top rail grid, at least one transport vehicle operating on the transfer rail grid, a picking/stocking station for picking/stocking items between a storage container and a packaging box, a dedicated transport vehicle operating between the picking/stocking station and the transfer rail grid, and an unloading/loading assembly for unloading/loading packaging boxes containing such items, the picking/stocking station is operatively connected to a transfer column of the storage grid structure, such that a storage container is transferred by the dedicated transport vehicle between the picking/stocking station and the storage column, and the transport vehicle is arranged to move upon the transfer rail grid in two perpendicular directions and comprises a carrier platform, wherein the transfer rail grid is arranged to allow access for the transport vehicle to transport one or more packaging boxes at a time between the picking/stocking station and the unloading/loading assembly.

2. A storage system according to claim 1, wherein the carrier platform is for supporting a pallet on which the one or more packaging boxes may be arranged.

3. A storage system according to claim 1, wherein the transport vehicle has a wheel arrangement comprising a first set of wheels enabling movement of the transport vehicle in a first direction and a second set of wheels enabling movement of the transport vehicle in a second direction perpendicular to the first direction, and each set of wheels comprises at least two pairs of wheels arranged on opposite sides of the transport vehicle.

4. A storage system according to claim 1, wherein the carrier platform comprises a conveyor assembly arranged to move an item arranged on the carrier platform in a horizontal direction off the transport vehicle.

5. A storage system according to claim 1, wherein the transport vehicle comprises at least two adjacently connected wheel base units upon which the carrier platform is arranged, and each wheel base unit features a wheel arrangement, wherein a first set of wheels enable movement of the transport vehicle in the first direction upon the transfer rail grid and a second set of wheels enable movement in the second direction, and each set of wheels comprises two pairs of wheels arranged on opposite sides of the wheel base unit.

6. A storage system according to claim 5, wherein each wheel base unit has a horizontal periphery fitting within the horizontal area defined by a grid cell of the transfer rail grid.

7. A storage system according to claim 5, wherein the transport vehicle comprises four connected wheel base units, preferably connected in a two by two configuration.

8. A storage system according to claim 1, wherein the carrier platform has a footprint of four storage containers arranged in a two by two configuration.

9. A storage system according to claim 1, wherein at least the transfer rails extending in one of two perpendicular directions of the transfer rail grid are dual-track rails, such that the transport vehicle may pass another transport vehicle upon an adjacent grid cell of the transfer rail grid when moving in the one direction.

10. A storage system according to claim 1, wherein the transport vehicle comprising at least two adjacently connected wheel base units, the carrier platform supported upon the wheel base units, and each wheel base unit features a wheel arrangement having a first set of wheels enabling lateral movement of the transport vehicle in a first direction upon a rail grid and a second set of wheels enabling lateral movement of the transport vehicle in a second direction being perpendicular to the first direction.

11. A storage system according to claim 10, wherein the carrier platform comprises a conveyor assembly able to move an item arranged on the carrier platform in a horizontal direction.

12. A method of transporting items out a storage system, comprising the steps of:
- retrieving at least one item from a storage container arranged in a picking/supply station via a dedicated transport vehicle;
- loading the item onto a transport vehicle from the dedicated transport vehicle;
- moving the transport vehicle to a unloading/loading assembly; and
- retrieving the item from the transport vehicle by use of the unloading/loading assembly,
- wherein the picking/supply station is operatively connected to a storage column, such that the storage container is transferred by the dedicated transport vehicle between the picking/stocking station and the storage column.

13. A method of transporting items into a storage system, comprising the steps of:
- supplying at least one item to a transport vehicle by use of a unloading/loading assembly,
- moving the transport vehicle from the unloading/loading assembly to a dedicated transport vehicle,
- transfer the item to the dedicated transport vehicle from the transport vehicle,
- moving the dedicated transport vehicle to a picking/supply station,
- retrieving the item from the dedicated transport vehicle, and
- loading the item into a storage container arranged in the picking/supply station,
- wherein the picking/supply station is operatively connected to a storage column, such that the storage container is transferred by the dedicated transport vehicle between the picking/supply station and the storage column.

* * * * *